(12) United States Patent
Lee et al.

(10) Patent No.: US 12,010,253 B2
(45) Date of Patent: Jun. 11, 2024

(54) ELECTRONIC DEVICE INCLUDING FLEXIBLE DISPLAY

(71) Applicant: SAMSUNG ELECTRONICS CO., LTD., Suwon-si (KR)

(72) Inventors: Seungjoon Lee, Suwon-si (KR); Moonchul Shin, Suwon-si (KR); Youngmin Kang, Suwon-si (KR); Hyunsuk Kim, Suwon-si (KR); Yeonggyu Yoon, Suwon-si (KR); Inkuk Yun, Suwon-si (KR); Hojin Jung, Suwon-si (KR); Joongyeon Cho, Suwon-si (KR); Junyoung Choi, Suwon-si (KR); Byounguk Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 298 days.

(21) Appl. No.: 17/510,874

(22) Filed: Oct. 26, 2021

(65) Prior Publication Data

US 2022/0150337 A1 May 12, 2022

Related U.S. Application Data

(63) Continuation of application No. PCT/KR2021/013439, filed on Sep. 30, 2021.

(30) Foreign Application Priority Data

Nov. 6, 2020 (KR) .................. 10-2020-0147441
Apr. 14, 2021 (KR) .................. 10-2021-0048406

(51) Int. Cl.
*H04M 1/02* (2006.01)
*G06F 1/16* (2006.01)
*H04W 4/80* (2018.01)

(52) U.S. Cl.
CPC ........ *H04M 1/0237* (2013.01); *G06F 1/1624* (2013.01); *G06F 1/1652* (2013.01);
(Continued)

(58) Field of Classification Search
CPC ............. H04M 1/0237; H04M 1/0268; H04M 1/0266; H04M 1/0295; H04B 1/03;
(Continued)

(56) References Cited

U.S. PATENT DOCUMENTS 1,100,219 A * 6/1914 Kim .................. C02F 1/325
137/533.15
9,164,547 B1 * 10/2015 Kwon .................. G06F 1/1652
(Continued)

FOREIGN PATENT DOCUMENTS

KR 10-2015-0076119 7/2015
KR 10-2016-0009726 1/2016
(Continued)

OTHER PUBLICATIONS

International Search Report and Written Opinion dated Jan. 5, 2022 in corresponding International Application No. PCT/KR2021/013439.
(Continued)

*Primary Examiner* — Andrew Wendell
(74) *Attorney, Agent, or Firm* — NIXON & VANDERHYE P.C.

(57) ABSTRACT

According to various embodiments of the disclosure, an electronic device may comprise: a first housing, a flexible display including a first area disposed on the first housing and a second area extending from the first area and deformable into a curved shape, and a multi-bar structure comprising a plurality of bars and having an end coupled to the first housing and deformably supporting the second area. The multi-bar structure may include a support having a surface
(Continued)

disposed to support the second area, and at least one rail disposed on another surface of the support when viewed from outside of the flexible display, wherein the rail is at least partially disposed in an area overlapping the second area.

14 Claims, 16 Drawing Sheets

(52) U.S. Cl.
CPC ........ *G06F 1/1656* (2013.01); *H04M 1/0268* (2013.01); *H04W 4/80* (2018.02)

(58) Field of Classification Search
CPC ....... H04B 1/08; G06F 1/1624; G06F 1/1652; G06F 1/1656; G06F 1/16; G09F 9/30
See application file for complete search history.

(56) References Cited

U.S. PATENT DOCUMENTS

| | | | |
|---|---|---|---|
| 10,742,784 B1* | 8/2020 | Jo | H04M 1/0237 |
| 11,245,781 B2* | 2/2022 | Song | H04M 1/0268 |
| 11,581,500 B2 | 2/2023 | Song et al. | |
| 2015/0187136 A1 | 7/2015 | Grimaud | |
| 2016/0081204 A1 | 3/2016 | Park et al. | |
| 2018/0011515 A1* | 1/2018 | Yoo | G06F 1/1681 |
| 2018/0103550 A1* | 4/2018 | Seo | G06F 1/1601 |
| 2019/0261519 A1 | 8/2019 | Park et al. | |
| 2019/0268455 A1 | 8/2019 | Baek et al. | |
| 2019/0305237 A1 | 10/2019 | Shin et al. | |
| 2020/0103668 A1 | 4/2020 | Frank | |
| 2020/0120814 A1* | 4/2020 | Huang | H04M 1/0268 |
| 2020/0348727 A1 | 11/2020 | Lee | |
| 2021/0044683 A1 | 2/2021 | He et al. | |
| 2021/0099557 A1* | 4/2021 | Cha | G06F 1/1624 |
| 2022/0155823 A1 | 5/2022 | Shin et al. | |
| 2022/0167512 A1 | 5/2022 | Ahn | |
| 2022/0210253 A1 | 6/2022 | Kwak et al. | |
| 2023/0063858 A1* | 3/2023 | Cavallaro | H04M 1/0237 |

FOREIGN PATENT DOCUMENTS

| | | |
|---|---|---|
| KR | 10-2017-0116551 A | 10/2017 |
| KR | 10-2019-0064552 | 6/2019 |
| KR | 10-2019-0101184 | 8/2019 |
| KR | 10-2019-0101605 | 9/2019 |
| KR | 10-2019-0113128 | 10/2019 |
| KR | 10-2111376 | 5/2020 |
| KR | 10-2020-0124989 | 11/2020 |
| KR | 10-2021-0153523 | 12/2021 |
| KR | 10-2022-0015775 | 2/2022 |
| KR | 10-2022-0029148 | 3/2022 |
| WO | WO 2019/153818 A1 | 8/2019 |
| WO | WO 2020/166821 A1 | 8/2020 |
| WO | WO 2020/209425 A1 | 10/2020 |
| WO | WO 2020/218674 A1 | 10/2020 |

OTHER PUBLICATIONS

European Examination Report dated Dec. 20, 2023 for EP Application No. 21889388.1.

* cited by examiner

ELECTRONIC DEVICE INCLUDING FLEXIBLE DISPLAY

CROSS-REFERENCE TO RELATED APPLICATIONS

This application is a continuation of International Application No. PCT/KR2021/013439 designating the United States, filed on Sep. 30, 2021, in the Korean Intellectual Property Receiving Office and claiming priority to Korean Patent Application No. 10-2020-0147441, filed on Nov. 6, 2020 and Korean Patent Application No. 10-2021-0048406, filed on Apr. 14, 2021, in the Korean Intellectual Property Office, the disclosures of which are incorporated by reference herein in their entireties.

BACKGROUND

Field

The disclosure relates to an electronic device, e.g., an electronic device with a flexible display.

Description of Related Art

As the demand for mobile communication increases, or as the degree of integration of electronic devices increases, the portability of electronic devices such as mobile communication terminals may be increased, and better convenience may be provided in use of multimedia functions.

Use of an electronic device with a larger screen may give more convenience in, e.g., web browsing or multimedia playing. A larger display may be adopted to output a larger screen. However, this way may be limited by the portability of the electronic device. According to an embodiment, flexible displays may allow better portability for electronic devices while providing a larger screen. For example, a foldable (or bendable) or rollable flexible display (or an electronic device equipped with it) may be included in an electronic device to provide an increased screen display area.

An electronic device with a flexible display which is at least partially rollable or foldable has difficulty in securing a stable antenna operation environment. For example, in a flexible display-equipped electronic device, a multi-bar structure formed of a conductive member and disposed to support folding/unfolding or extension/contraction may affect the operation environment of the antenna, degrading the performance of the antenna.

The above-described information may be provided as background for the purpose of helping understanding of the disclosure. No claim or determination is made as to whether any of the foregoing is applicable as background art in relation to the disclosure.

SUMMARY

Embodiments of the disclosure address the foregoing issues and/or drawbacks and provide advantages described below, providing an electronic device which may secure stable antenna performance despite including a flexible display.

Embodiments of the disclosure may provide an electronic device capable of securing an antenna performance while expanding the screen display area of the flexible display.

Without being limited to the foregoing issues, additional aspects according to various embodiments will be suggested below in conjunction with the detailed description and will be apparent or understood by the various example embodiments.

According to various example embodiments of the disclosure, an electronic device may comprise: a first housing, a flexible display including a first area disposed on the first housing and a second area extending from the first area and deformable into a curved shape, and a multi-bar structure including a plurality of bars having an end coupled to the first housing and deformably supporting the second area. The multi-bar structure may include a support having a surface disposed to support the second area, and at least one rail disposed on another surface of the support when viewed from outside of the flexible display, wherein the rail is at least partially disposed in an area overlapping the second area.

According to various example embodiments of the disclosure, an electronic device may comprise: a first housing including a first surface, a second surface facing away from the first surface, and a side wall at least partially surrounding a space between the first surface and the second surface, a second housing coupled to be slidable from one side of the first housing and configured to be selectively received in the first housing, guide grooves individually formed in surfaces facing each other inside the second housing, a flexible display including a first area disposed on the first housing and a second area extending from the first area and deformable into a curved shape, and a multi-bar structure comprising multiple bars having an end coupled to the first housing and deformably supporting the second area while moving on the second housing. The multi-bar structure may include a support including a plurality of rods arranged along one direction and having one surface disposed to support the second area and at least one rail disposed on another surface of the support in an area overlapping the second area when viewed outside of the flexible display. The rail may be at least partially disposed to be movable in the guide groove. The second area or the multi-bar structure may be configured to be selectively received in the second housing as the second housing slides.

According to various example embodiments of the disclosure, the electronic device includes a guide structure including a 'C'-shaped structure while supporting the flexible display, thereby making it easy to downsize the electronic device and/or to expand the flexible display in the electronic device of the same size.

According to various example embodiments of the disclosure, a sufficient gap may be secured between the antenna and the supporting structure (or guide structure) even when the supporting structure or guide structure is positioned adjacent to the antenna on the electronic device. Thus, it is possible to secure an antenna performance Other various effects may be provided directly or indirectly in the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The following description taken in conjunction with the accompanying drawings may be presented to provide an understanding of various implementations of the disclosure. The specific embodiments disclosed in the following description entail various details to aid understanding, but are regarded as one of various example embodiments. Accordingly, it will be apparent to those skilled in the art that various changes and modifications may be made to the various implementations described in the disclosure without departing from the scope and spirit of the disclosure. Further, descriptions of well-known functions and configurations may be omitted for clarity and brevity.

The terms and words used in the following description and claims are not limited to the bibliographical meaning, but may be used to clearly and consistently describe the various embodiments of the disclosure. Therefore, it will be apparent to those skilled in the art that the following description of various implementations of the disclosure is provided only for the purpose of description, not for the purpose of limiting the disclosure defined as the scope of the claims and equivalent thereto.

The singular forms "a," "an," and "the" are intended to include the plural forms as well, unless the context clearly indicates otherwise. Thus, as an example, "a component surface" may be interpreted as including one or more of the surfaces of a component.

Figure 1:
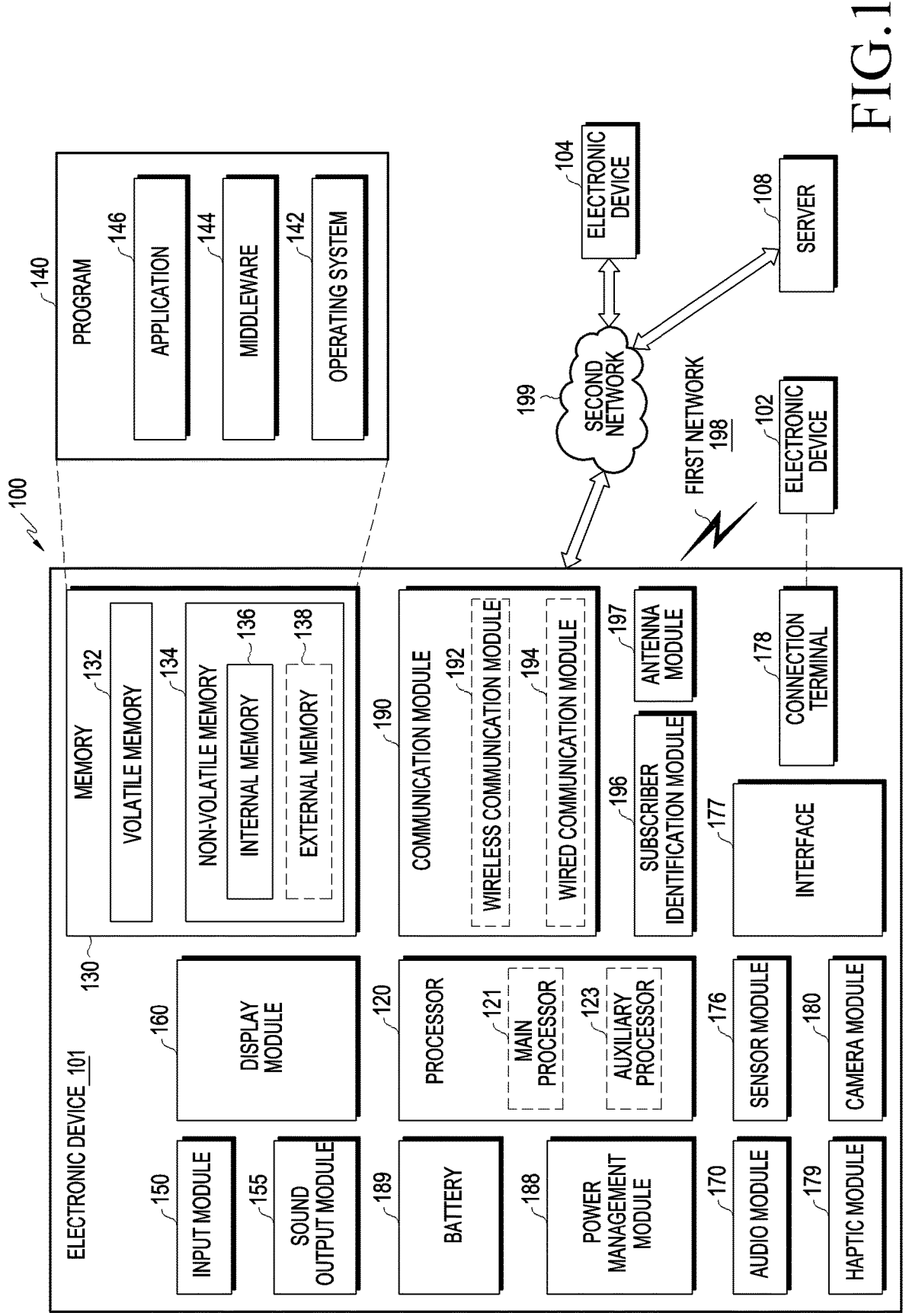
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
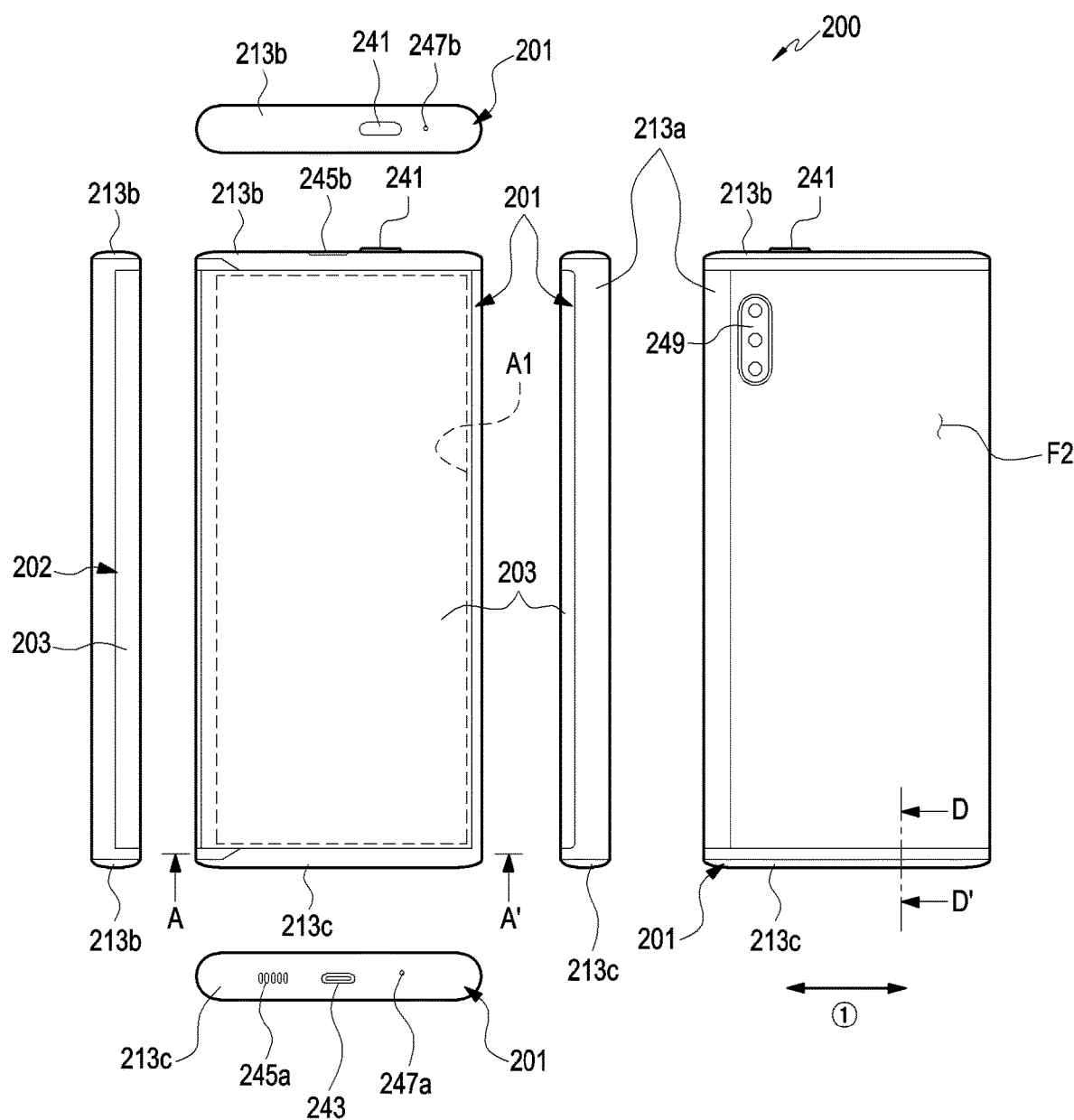
FIG. 2 is a diagram illustrating an electronic device, wherein a portion of a flexible display is received in a second housing according to various embodiments.
Figure 3:
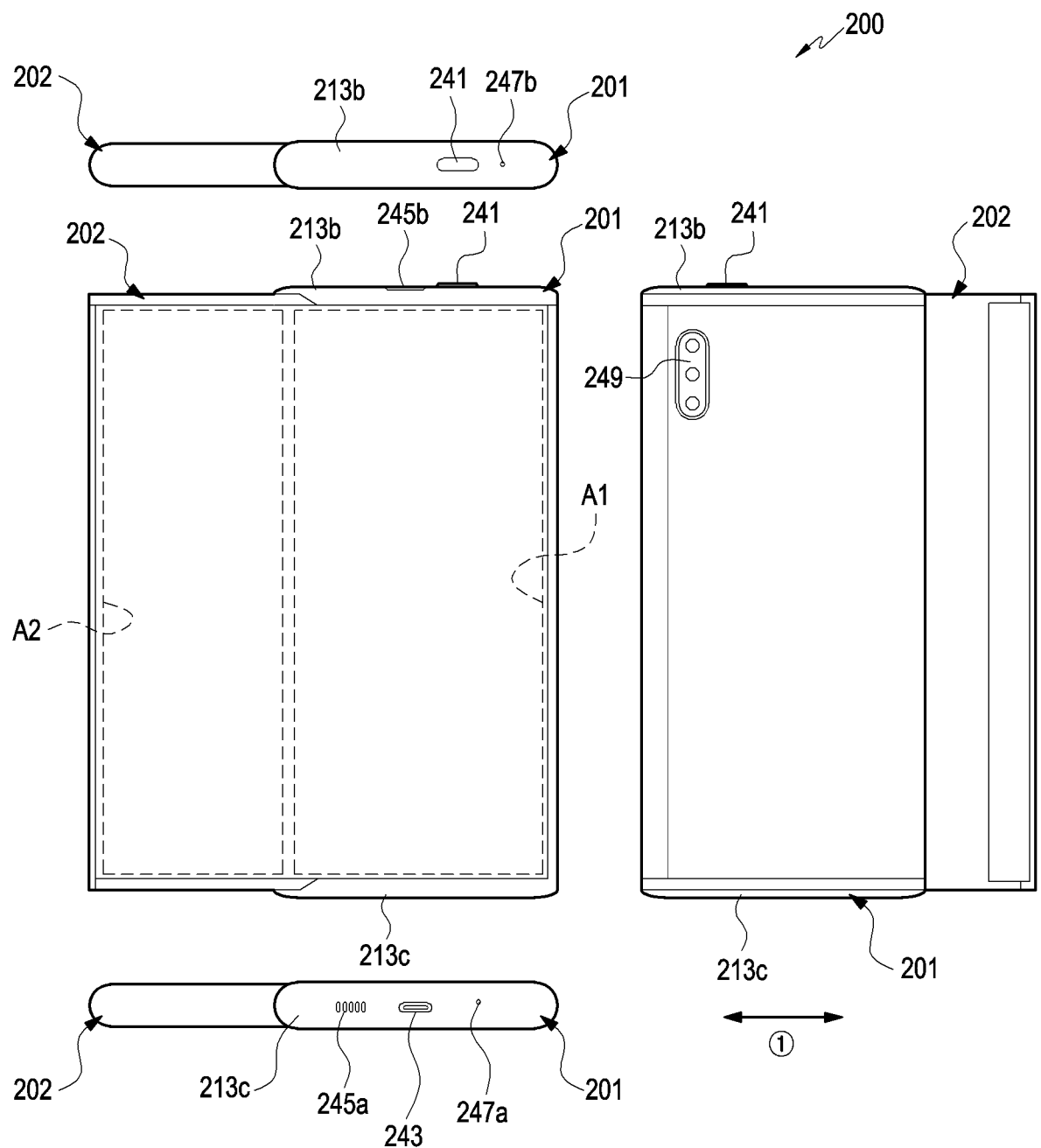
FIG. 3 is a diagram illustrating an electronic device, wherein a portion of a flexible display is exposed to the outside of a second housing according to various embodiments.

FIG. 2 is a diagram illustrating an electronic device 200 (e.g., the electronic devices 101, 102, or 104 of FIG. 1) according to various embodiments, in which a portion (e.g., a second area A2) of a flexible display 203 is received in a second housing 202. FIG. 3 is a diagram illustrating an electronic device 200 according to various embodiments of the disclosure, wherein a portion (e.g., the second area A2) of a flexible display 203 is exposed to the outside of the second housing 202.

The state shown in FIG. 2 may be a state in which a second housing 202 is closed with respect to a first housing 201, and the state shown in FIG. 3 may be a state in which the second housing 202 is open with respect to the first housing 201. According to an embodiment, the "closed state" or "opened state" may be defined as a closed or open state of the electronic device 200. In various embodiments, the state illustrated in FIG. 2 may be a state in which at least a portion of the flexible display 203 or the second area A2 is received. The state illustrated in FIG. 3 may be a state in which at least a portion of the flexible display 203 or the second area A2 is exposed or expanded.

Referring to FIGS. 2 and 3, the electronic device 200 may include a first housing 201 and a second housing 202 disposed to be movable from the first housing 201. In various embodiments, in the electronic device 200, the first housing 201 may be slidably disposed on the second housing 202. According to an embodiment, the first housing 201 and the second housing 202 may be disposed to be able to reciprocate by a predetermined distance in the shown direction, e.g., the direction indicated by the arrow ① (e.g., the X-axis direction of FIG. 4). In various embodiments, in the closed state, the second area A2 or the second housing 202 may be substantially received in the first housing 201. According to an embodiment, the second housing 202 is linearly movable relative to the first housing 201 by a driving device, such as an elastic member, a motor, or a linear actuator not shown.

Figure 4:
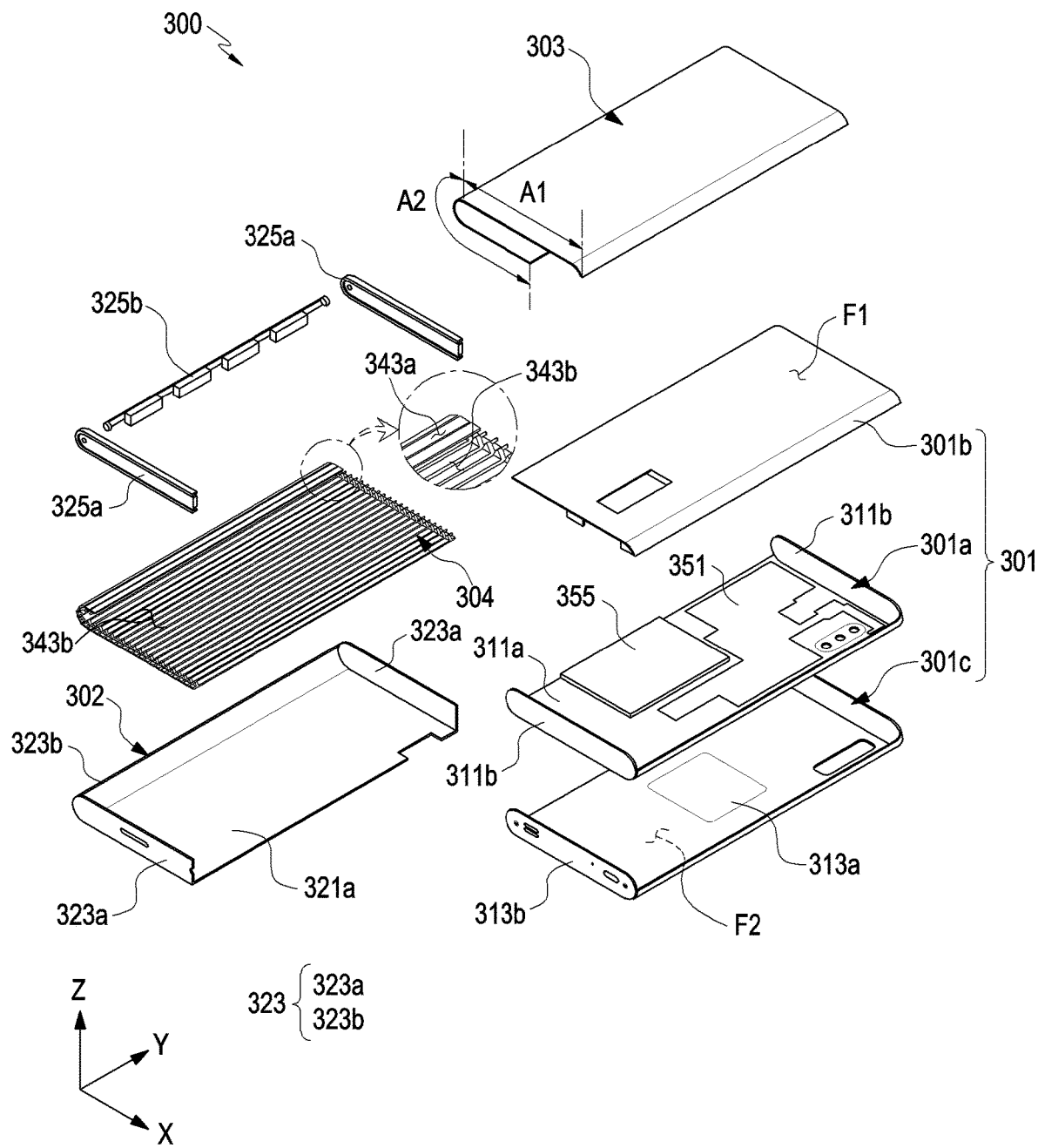
FIG. 4 is an exploded perspective view illustrating an electronic device according to various embodiments.

According to various embodiments, the first housing 201 may be referred to as, e.g., a main part or a main housing and may receive various electrical and electronic components, such as a main circuit board (e.g., the first circuit board 351 of FIG. 4) or a battery (e.g., the battery 189 or 355 of FIG. 1 or 4). In an embodiment, the second housing 202 may be referred to as, e.g., a slide part or a slide housing and may be disposed to reciprocate on the first housing 201. For example, the second housing 202 may be disposed to be slidable from one side of the first housing 201 and, as the second housing 202 slides with respect to the first housing 201, it may be selectively received into the first housing 201.

According to various embodiments, a portion (e.g., the first area A1) of the flexible display 203 (e.g., the display module 160 of FIG. 1) may be seated in the first housing 201. According to an embodiment, at least a portion of another portion (e.g., the second area A2) of the display 203 may be received (e.g., slide-in) into the inside of the second housing 202 or exposed (e.g., slide-out) to the outside of the second housing 202 as the second housing 202 moves (e.g., slides) relative to the first housing 201. For example, when the second housing 202 is received in the first housing 201, the second area A2 may be received in the second housing 202. In an embodiment, if the second housing 202 slides and withdraws from the first housing 201, the second area A2 may be exposed to the outside of the second housing 202 and/or the first housing 201. In an embodiment, the first area A1 of the flexible display 203 may be an area that is always visible to the outside regardless of the slide of the second housing 202, and the second area A2 may or may not be visible to the outside as the second housing 202 slides. For example, the second area A2 may be an area selectively received in the second housing 202 according to the slide of the second housing 202. If the first area A1 is an area that is always visible to the outside regardless of the slide of the second housing 202, a portion (e.g., a portion adjacent to the second area A2) of the first area A1 may be deformed into a curved shape, with the second housing 202 in the slide-in state.

According to various embodiments, the first housing 201 may include a third plate 313a (refer to FIG. 4) (e.g., a rear case) that forms a second surface F2, a first sidewall 213a extending from the third plate 313a, a second sidewall 213b extending from the first sidewall 213a and the third plate 313a, and/or a third sidewall 213c extending from the first sidewall 213a and the third plate 313a and parallel to the second sidewall 213b. In various embodiments, the second sidewall 213b and the third sidewall 213c may be formed substantially perpendicular to the first sidewall 213a. According to an embodiment, the third plate 313a, the first sidewall 213a, the second sidewall 213b and the third sidewall 213c may be formed to have an open surface (e.g., a front surface) to receive (or surround) at least a portion of the second housing 202 and/or the flexible display 203. For example, the second housing 202 may be slid in a direction parallel to the second surface F2, e.g., the direction indicated by arrow ① while being guided by the first housing 201, with the second housing 202 surrounded by the first housing 201. According to an embodiment, the second sidewall 213b or the third sidewall 213c may be omitted. According to an embodiment, the third plate 313a, the first sidewall 213a, the second sidewall 213b, and/or the third sidewall 213c may be formed as separate structures and combined or assembled.

According to various embodiments, the second housing 202 may move to the open or closed state with respect to the first housing 201 in a first direction (e.g., the direction indicated by arrow ① or the X-axis direction of FIG. 3) parallel to the third plate 313a (e.g., the rear case) and the second sidewall 213b. For example, the second housing 202 may be moved to be positioned at a first distance from the first sidewall 213a in the closed state and at a second distance, greater than the first distance, from the first sidewall 213a in the open state. In an embodiment, the second housing 202 may be linearly moved with respect to the first housing 201 by a driving force provided by an elastic member or a driving device (not shown). According to an embodiment, the electronic device 200 may further include an intermediate state between the open state and the closed state. For example, the intermediate state may include a process in which the electronic device 200 is changed from the open state to the closed state or a process in which the electronic device 200 is changed from the closed state to the open state.

According to various embodiments, the electronic device 200 may include a flexible display 203, a key input device 241, a connector hole 243, audio modules 245a, 245b, 247a, and 247b, or a camera module 249. Although not shown, the electronic device 200 may further include an indicator (e.g., a light emitting diode (LED) device) or various sensor modules.

According to various embodiments, the flexible display 203 may include a first area A1 and a second area A2. In an embodiment, the first area A1 may be substantially disposed on the first surface (e.g., the first surface F1 of FIG. 4), and the second area A2 may extend from the first area A1 and may be inserted or received into the inside of the second housing 202 or be exposed to the outside of the second housing 202 as the second housing 202 slides. In an embodiment, the second area A2 may be substantially moved while being guided by the first guide member and/or the second guide member 325a or 325b (see FIG. 4) mounted on the second housing 202, and may thus be received into the inside of the second housing 202 or exposed to the outside of the second housing 202. In various embodiments, a portion (e.g., a portion corresponding to the second guide member 325b) of the second area A2 may be curved while the second housing 202 slides relative to the first housing 201 and move to the inside or outside of the second housing 202. In an embodiment, a portion, outside the section corresponding to the second guide member 325b, of the second area A2 may remain substantially in a flat shape. In an embodiment, in an intermediate position between the closed state and the open state, the flexible display 203 may be deformed into a 'U' shape.

According to various embodiments, when the second housing 202 moves from the closed state to the open state, the second area A2 is gradually exposed to the outside of the second housing 202 and, along with the first area A1, may form a substantially flat surface. The display 203 may be disposed to be coupled with, or adjacent to, at least one of the input modules 150 of FIG. 1, e.g., a touch detecting circuit, a pressure sensor capable of measuring the strength (pressure) of touches, and/or a digitizer for detecting a magnetic field-type stylus pen. In an embodiment, the second area A2 may be at least partially received into the inside of the second housing 202 as the second housing 202 slides. Even in the state illustrated in FIG. 2 (e.g., in the closed state), a portion of the second area A2 may be exposed to the outside. In various embodiments, regardless of the closed state or the open state, the exposed portion of the second area A2 may be positioned on a guide member (e.g., the second guide member 325b of FIG. 4). A portion of the second area A2 may remain in a curved shape in the position corresponding to the guide member. In an embodiment, when the area exposed to the outside is the first area A1 even in the closed state, a portion (e.g., a portion adjacent to the second area A2) of the first area A1 may be positioned on a guide member (e.g., the second guide member 325b of FIG. 4) and may be deformed into a curved shape.

According to various embodiments, the key input device 241 may be disposed on the second sidewall 213b or the third sidewall 213c of the first housing 201. Depending on the exterior or the use state of the electronic device 200, the electronic device 200 may be designed to omit the illustrated key input device 241 or to include additional key input device(s). According to an embodiment, the electronic device 200 may include a key input device (not shown), e.g., a home key or a touchpad disposed around the home key. In an embodiment, a portion of the key input device, not shown, may be disposed in the second housing 202.

According to various embodiments, the connector hole 243 may receive an external connector (e.g., a USB connector) for transmitting and receiving power and/or data to and from an external electronic device (e.g., the electronic device 102 or 104 of FIG. 1). A connector (e.g., the connector 457 of FIG. 12) corresponding to the connector hole 243 may be disposed inside the electronic device 200. In various embodiments, the connector hole 243 or a connector corresponding to the connector hole 243 may be omitted. For example, if power or data may be wirelessly transmitted/received with the external electronic devices 102 and 104, the connector hole 243 may be omitted. Although not shown, the electronic device 200 may include a plurality of connector holes 243, and some of the plurality of connector holes 243 may function as connector holes for transmitting/receiving audio signals with the external electronic device 102 or 104. In the illustrated embodiment, the connector hole 243 is disposed on the third sidewall 213c, but the various embodiments disclosed herein are not limited thereto, and the connector hole 243 or a connector hole not shown may be formed in the first sidewall 213a or the second sidewall 213b.

According to various embodiments, the audio modules 245a, 245b, 247a, and 247b may include speaker holes 245a and 245b or microphone holes 247a and 247b. One of the speaker holes 245a and 245b may be provided as a receiver hole for voice calls, and the other may be provided as an external speaker hole. In the microphone holes 247a and 247b, a microphone for obtaining an external sound may be disposed therein and, in various embodiments, a plurality of microphones may be disposed in one microphone hole 247a or 247b to detect the direction of the sound. In various embodiments, the speaker holes 245a and 245b and the microphone holes 247a and 247b may be implemented as one hole, or a speaker may be included without the speaker holes 245a and 245b (e.g., a piezo speaker). According to an embodiment, the speaker hole indicated by the reference number "245b" may be disposed in the front surface of the first housing 201 and used as a receiver hole for voice calls, and the speaker hole indicated by the reference number "245a" (e.g., an external speaker hole) or the microphone holes 247a and 247b may be disposed in a side surface (e.g., one of the side surfaces 213a, 213b, and 213c) of the first housing 201.

The camera module 249 may be positioned in the first housing 201 (e.g., the second surface F2) and may capture a subject in a direction opposite to the first area A1 of the display 203. The electronic device 200 may include a plurality of camera modules 249, or the camera module 249 may include a plurality of image sensors. For example, the electronic device 200 may include a wide-angle camera, a telephoto camera, or a close-up camera, and according to an embodiment, by including an infrared projector and/or an infrared receiver, the electronic device 100 may measure the distance to the subject. The camera module 249 may include one or more lenses, an image sensor, and/or an image signal processor. Although not shown, the electronic device 200 may further include a camera module (e.g., a front camera) that captures a subject in a direction in which the first area A1 of the display 203 outputs a screen. For example, the front camera may be disposed around the first area A1 or in an area overlapping the first area A1 and, when disposed in the area overlapping the display 203, the front camera may capture the subject through the display 203.

According to various embodiments, an indicator (not shown) of the electronic device 200 may be disposed on the first housing 201 or the second housing 202, and the indicator may include a light emitting diode to provide state information about the electronic device 200 as a visual signal. The sensor module (e.g., the sensor module 176 of FIG. 1) of the electronic device 200 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). According to an embodiment, the sensor module may further include, e.g., at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

FIG. 4 is an exploded perspective view illustrating an electronic device (e.g., the electronic device 101, 102, 104, or 200 of FIG. 1 or 3) according to various embodiments.

Referring to FIG. 4, the electronic device 300 may include a first housing 301 (e.g., the first housing 201 of FIG. 2 or 3), a second housing 302 (e.g., the second housing 202 of FIG. 2 or 3), a display 303 (e.g., the display module 160 or flexible display 203 of FIGS. 1 to 3, as a flexible display), a guide member (e.g., the first guide member 325a or the second guide member 325b), and/or a multi-bar structure 304. A portion (e.g., the second area A2) of the display 303 may be moved on the second housing 302 while being guided by the guide members 325a and 325b or may be deformed into a curved or flat shape.

According to various embodiments, the first housing 301 may include a first plate 311a, a second plate 301b, a third plate 313a, and/or side structures 311b and 313b. In an embodiment, the first side structure 311b may be disposed on at least a portion of the circumference of the first plate 311a or may be formed integrally with the first plate 311a. In various embodiments, the first plate 311a and the first side structure 311b may be integrally formed, forming the first housing member 301a. In an embodiment, a second plate 301b provided as the second housing member may be disposed in an area at least partially surrounded by the first side structure 311b in front of the first plate 311a. The second plate 301b may substantially form the front surface or the first surface F1 of the first housing 301. In an embodiment, the second side structure 313b may be disposed on at least a portion of the circumference of the third plate 313a or may be formed integrally with the third plate 313a. In various embodiments, the third plate 313a and the second side structure 313b may be integrally formed, forming the third housing member 301c.

According to various embodiments, the first plate 311a, the second plate 301b, the third plate 313a, and/or the side structures 311b and 313b may include a metal or a polymer material. In an embodiment, the structure exposed through the exterior of the electronic device 300, e.g., the third housing member 301c, may include a material, such as glass, synthetic resin, or ceramic, thereby providing a decorative effect. In various embodiments, the first plate 311a and/or the second plate 301b may include an electrically conductive material. For example, the first plate 311a and/or the second plate 301b may be utilized as a ground conductor inside the electronic device 300 (e.g., the first housing 301) or may provide an electromagnetic shielding structure. In an embodiment, at least one (e.g., the first side structure 311b) of the side structures 311b and 313b may at least partially include an electrically conductive material. The electronic device 300 (e.g., the processor 120 or the communication module 190 of FIG. 1) may be configured to transmit/receive wireless signals using at least a portion (e.g., a portion formed of an electrically conductive material) of the side structures 311*b* and 313*b*.

According to various embodiments, the third housing member 301*c* may be disposed to surround the first housing member 301*a* and/or the second housing member (e.g., the second plate 301*b*) substantially in the −Z direction of the first housing member 301*a*. In various embodiments, the second surface F2 of the first housing 301 (e.g., the first housing 201 of FIG. 2 or 3) may be substantially at least a portion of the third housing member 301*c*. In an embodiment, the first plate 311*a* may substantially divide a space between the first surface F1 and the second surface F2, and any one of the spaces divided by the first plate 311*a* may receive a portion of the second housing 302, the second area A2 of the display 203 and/or the multi-bar structure 304. For example, in the space between the first plate 311*a* and the third plate 313*a*, the fourth plate 321*a* of the second housing 302, the second area A2, and/or the multi-bar structure 304 may be received. Accordingly, in the inside of the first housing 301, the space in which the first circuit board 351 is disposed, the fourth plate 321*a* of the second housing 302, and the space in which the second area A2 and/or the multi-bar structure 304 is received may be separated by a first plate 311*a*. In an embodiment, although not shown, in the space between the first plate 311*a* and the third plate 313*a*, an antenna for near field communication (NFC), an antenna for wireless charging, or an antenna for magnetic secure transmission (MST) may be disposed.

According to various embodiments, the side structures 311*b* and 313*b* may be disposed to at least partially surround the space between the first surface F1 and the second surface F2. For example, the side surfaces 213*a*, 213*b*, and 213*c* of FIG. 2 may be formed by coupling the first housing member 301*a* and the third housing member 301*c*. In various embodiments, the side structures 311*b* and 313*b* may at least partially include an electrically conductive material. For example, when including an electrically conductive material, a portion of the side structures 311*b* and 313*b* may function as an antenna for transmitting and receiving radio signals. An antenna provided using the side structures 311*b* and 313*b* is described below in greater detail with reference to FIG. 12.

According to various embodiments, the electronic device 300 may include various electrical/electronic components received in the first housing 301, e.g., the first circuit board 351 and/or the battery 355. In an embodiment, hardware, such as the processor 120, memory 130, and/or interface 177 of FIG. 1, may be disposed on first circuit board 351. In various embodiments, the electronic device 300 may further include an additional circuit board (e.g., the second circuit board 451 or the flexible printed circuit board 453*a* of FIG. 12). The additional circuit board may be electrically connected with the first circuit board 351.

According to various embodiments, the first circuit board 351 and/or the battery 355 may be disposed in a space between the first surface F1 and the second surface F2 (e.g., the space between the first plate 311*a* and the second plate 301*b*). In various embodiments, the first plate 311*a* may isolate the space in which the first circuit board 351 or the battery 355 is disposed from the space in which a portion (e.g., the fourth plate 321*a*) of the second housing 302, the second area A2, and/or the multi-bar structure 304 are received. In an embodiment, at least a portion of the first area A1 of the display 303 may be substantially disposed on the first surface F1. The second plate 301*b* may protect the display 303 from interference with the first circuit board 351 or the battery 355.

According to various embodiments, the second housing 302 may include a fourth plate 321*a* and/or a third side structure 323. The third side structure 323 may include a pair of first sidewall portions 323*a* extending in a direction substantially perpendicular to the edge of the fourth plate 321*a* and disposed parallel to each other and a second sidewall portion 323*b* extending from the edge of the fourth plate 321*a* and disposed to connect the first sidewall portions 323*a*. In various embodiments, the first sidewall portions 323*a* may be formed as structures that guide movement of the second area A2 and/or the multi-bar structure 304. The second sidewall portion 323*b* may form a position or space in which the second area A2 and/or the multi-bar structure 304 is deformed into a curved shape. In the illustrated embodiment, guide members (e.g., the first guide members 325*a*) are positioned on the first sidewall portions 323*a* to guide the movement of the second area A2 and/or the multi-bar structure 304. In an embodiment, the guide member (e.g., the first guide member 325*a*) may be substantially integrally formed with or coupled to the first sidewall portion 323*a*.

According to various embodiments, when the second housing 302 is received in the first housing 301, the fourth plate 321*a* may be positioned between the first plate 311*a* and the second plate 301*b*, the first sidewall portions 323*a* may be positioned between the first side structures 311*b*. For example, the second housing 302 may be slid on the first housing 301 while being guided by the first plate 311*a* and/or the first side structures 311*b*. In an embodiment, when the second housing 302 is received in the first housing 301, the fourth plate 321*a* may be positioned between the first plate 311*a* and the third plate 313*a*. The first sidewall portion 323*a* may be positioned between the first side structure 311*b* and the second side structure 313*b*. For example, the second housing 302 may be slid on the first housing 301 while being guided by the first plate 311*a* and the third plate 313*a* and/or the first side structure 311*b* and the second side structure 313*b*. Although not shown, the driving device may provide driving force when at least the second housing 302 moves to an open position (e.g., the state illustrated in FIG. 3) or a closed position (e.g., the state illustrated in FIG. 2). In various embodiments, the second housing 302 may be moved to the open state (e.g., the state illustrated in FIG. 3) or closed state (e.g., the state illustrated in FIG. 2) as the user slides the second housing 302 with respect to the first housing 301 although the driving device provides no driving force.

According to various embodiments, the second housing 302 may include at least one guide member 325*a* and 325*b*, guiding the movement or deformation of the second area A2 and/or the multi-bar structure 304. For example, the second housing 302 may include a first guide member(s) 325*a* for guiding the movement of the second area A2 and/or the multi-bar structure 304 and a second guide member 325*b* for guiding the deformation of the second area A2 and/or the multi-bar structure 304. Although the first guide member 325*a* is illustrated as a separate component from the second housing 302 in FIG. 4, various embodiments of the disclosure are not limited thereto, and the first guide member 325*a* may be provided integrally with the inner wall (e.g., the first sidewall portion 323*a*) of the second housing 302. For example, the first guide member 325*a* may be a portion of the second housing 302 and/or the first sidewall portion 323*a*.

According to various embodiments, the first guide member 325a may be disposed on the inner surface of the first sidewall portion 323a, and two opposite ends of the second guide member 325b may be coupled with any one of the first guide members 325a. If the first guide member 325a is disposed in the second housing 302, e.g., mounted on the inner surface of the first sidewall portion 323a, the second guide member 325b may be disposed adjacent to the inner surface of the second sidewall portion 323b. In an embodiment, the second area A2 and/or the multi-bar structure 304 may enter the second housing 302 or, be withdrawn from the second housing 501b, substantially through the gap between the second guide member 325b and the second sidewall portion 323b. When the second housing 302 slides, the second area A2 and/or the multi-bar structure 304 may be moved on the second housing 302 substantially along the trajectory provided by the first guide member 325a, and a portion adjacent to the second guide member 325b may be deformed into a curved shape. In various embodiments, a portion of the second area A2 and/or the multi-bar structure 304 received in the inside of, or exposed to the outside of the second housing 302 may remain in a flat shape.

According to various embodiments, when the display 303 is deformed into a curved shape, the second guide member 325b may maintain a radius of curvature of the display 303 to a certain degree, thereby suppressing excessive deformation of the display 303. The term "excessive deformation" may refer, for example, to the display 303 being deformed to have a radius of curvature that is too small to damage pixels or signal lines included in the display 303. For example, the display 303 may be moved or deformed while being guided by the second guide member 325b and may be protected from damage due to excessive deformation. In various embodiments, the second guide member 325b may at least partially include a lubricating material (e.g., polyoxymethylene (POM)) or be rotatably formed within the second housing 302. For example, the second guide member 325b may suppress or mitigate friction between the multi-bar structure 304 (or the display 303) and the second housing 302 while the multi-bar structure 304 or the display 303 is inserted into the second housing 302 or withdrawn from the second housing 302, facilitating the insertion or extraction operation.

According to various embodiments, the first guide member 325a may include a polymer material (e.g., polyoxymethylene (POM)) having mechanical strength and abrasion resistance or lubricity. In an embodiment, the first guide member 325a, together with the second guide member 325b, may prevent and/or reduce excessive deformation of the multi-bar structure 304 and/or the second area A2 while guiding the movement of the multi-bar structure 304 and/or the second area A2. The configuration of the first guide member 325a will be described in greater detail below with reference to FIG. 5.

Figure 5:
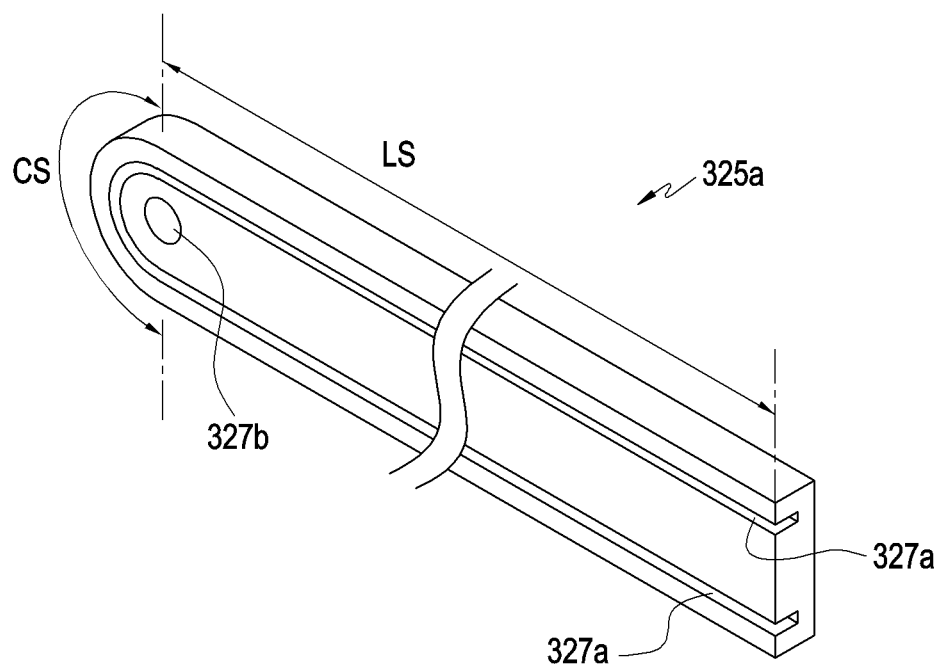
FIG. 5 is a perspective view illustrating a first guide member of an electronic device according to various embodiments.

FIG. 5 is a perspective view illustrating a first guide member 325a of an electronic device (e.g., the electronic devices 101, 102, 104, 200, and 300 of FIGS. 1 to 4) according to various embodiments.

Referring further to FIG. 5 together with FIG. 4, the first guide member 325a may have a flat shape extending in the moving direction of the second housing 302 (e.g., the direction indicated by the arrow ① of FIG. 2 or FIG. 3 or the X-axis direction of FIG. 4) and may include a guide groove 327a and/or a fastening hole 327b. In an embodiment, a portion (e.g., the second guide protrusion 347b of FIG. 7 or FIG. 8) of the multi-bar structure 304 may be movably disposed within the guide groove 327a. For example, the multi-bar structure 304 may substantially move along a trajectory in which the guide groove 327a is formed and may be deformed into a shape corresponding to the trajectory of the guide groove 327a.

According to various embodiments, the guide groove 327a may be formed in one surface of the first guide member 325a and may include a pair of straight sections LS and a single curved section CS. For example, the pair of straight sections LS may be formed substantially parallel to each other, and first ends of the straight sections LS may be connected through the curved section CS. In various embodiments, a portion of the second area A2 of the display 303 positioned to correspond to the straight section(s) LS may have a substantially flat shape. In an embodiment, a portion of the second area A2 of the display 303 corresponding to the curved section CS may be substantially deformed into a curved shape. For example, the guide groove 327a may provide a trajectory in which the second area A2 moves or may guide the deformation of the second area A2. In the present embodiment, a configuration in which the guide groove 327a includes a pair of straight sections LS is illustrated by way of example, but it should be noted that various embodiments disclosed herein are not limited thereto. For example, depending on the exterior design of the electronic device 300, the second area A2 may have a curved shape even when it is a portion received in the second housing 302 or exposed to the outside, and in this case, at least a portion of the straight section LS illustrated in FIG. 5 may be formed in a curved trajectory.

According to various embodiments, the curved section CS may have a designated radius of curvature. In various embodiments, the radius of curvature of the curved section CS may be set by an interval between the straight sections LS. In an embodiment, various radii of curvature of the curved section CS may be set depending on the thickness of the electronic device 300 and/or the second housing 302. In various embodiments, although flexible, the display 303 may have a tendency to be restored to a flat shape because it has a certain degree of elasticity. In an embodiment, even with flexibility, if the display 303 is deformed into a shape having an excessively small radius of curvature, an internal pixel or wiring structure may be damaged. The curved section CS and/or the radius of curvature of the curved section CS, together with the second guide member 325b, may guide deformation of the display 303 (e.g., the second area A2) into a curved shape while preventing and/or reducing deformation into a shape having an excessively small radius of curvature. According to an embodiment, the radius of curvature of the curved section CS may be about 2.7 mm or more and 3.7 mm or less. In various embodiments, within a range permitted by the specifications (e.g., thickness) of the electronic device 300 and/or the second housing 302, as the radius of curvature of the curved section CS increases, it may be easier to damage the display 302 (e.g., the second area A2) and secure durability.

According to various embodiments, the fastening hole 327b may be formed to pass through the first guide member 325a in the area surrounded by the curved section CS. In an embodiment, a fastening member (e.g., a screw) not shown may be coupled to one end of the second guide member 325b through the fastening hole 327b. For example, the first guide member 325a may be fixed to any one end of the second guide member 325b, and if the first guide member 325a is mounted on the first sidewall portion 323a of the second housing 302, the second guide member 325b may be fixed in the second housing 302 while being spaced apart from the second sidewall portion 323*b* at a designated interval.

According to various embodiments, as at least a portion of the first area A1 is disposed on the second plate 301*b* (e.g., the first surface F1), and at least a portion of the second area A2 is disposed on the multi-bar structure 304, the display 303 may be disposed along the first housing 301 and/or the second housing 302. In an embodiment, the first area A1 may be exposed to the outside while maintaining a substantially flat shape. As the second housing 302 slides, the second area A2 may be selectively exposed to the outside while being supported on the multi-bar structure 304. In various embodiments, even in the open state, a portion of the second area A2 may be positioned inside the second housing 302 (e.g., the gap between the second sidewall portion 323*b* and the second guide member 325*b* described above). The multi-bar structure 305 supporting the second area A2 is described in greater detail below with reference to FIGS. 6, 7 and 8.

Figure 6:
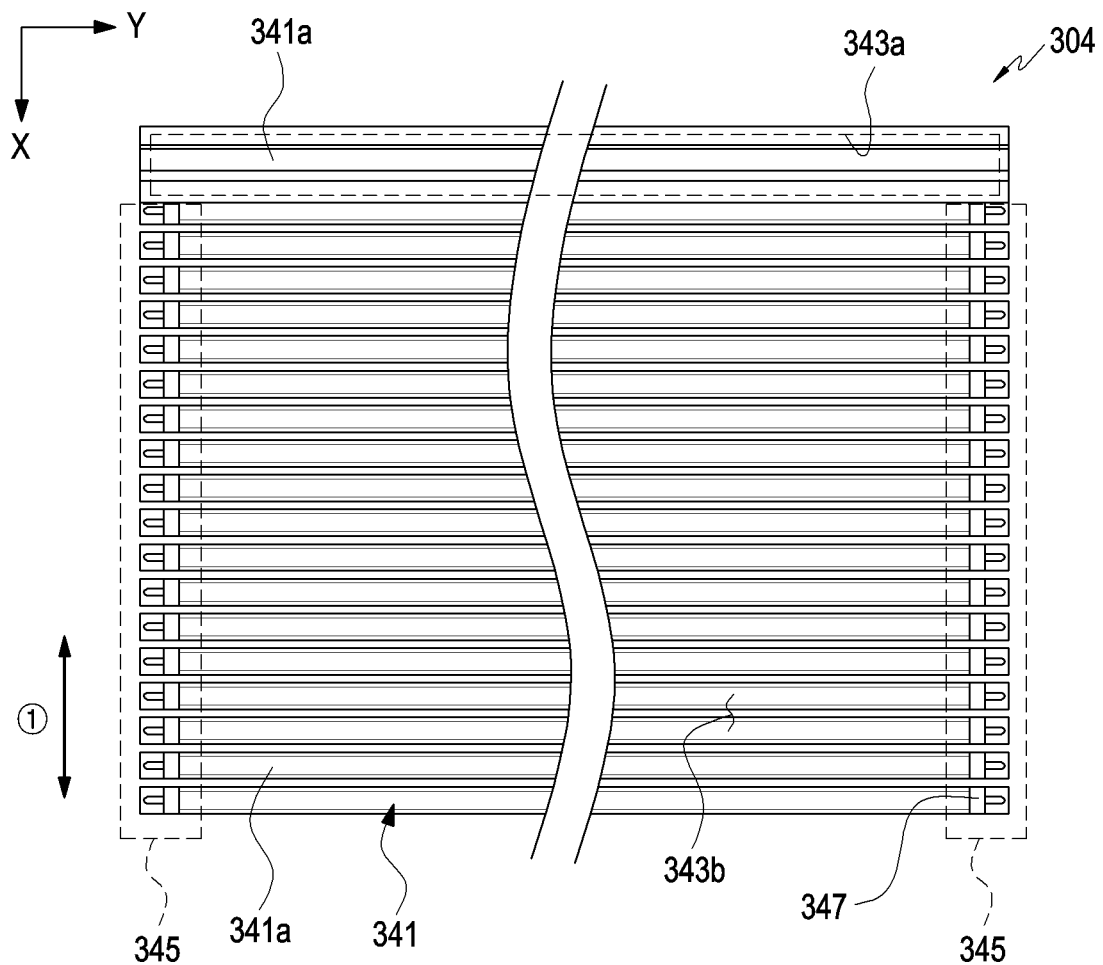
FIG. 6 is a diagram illustrating a multi-bar structure of an electronic device according to various embodiments.
Figure 7:
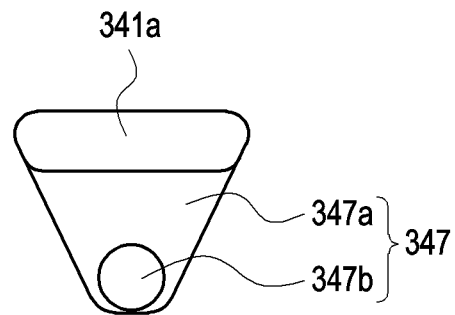
FIG. 7 is a diagram illustrating a first side view of a bar of a multi-bar structure in an electronic device according to various embodiments.
Figure 8:
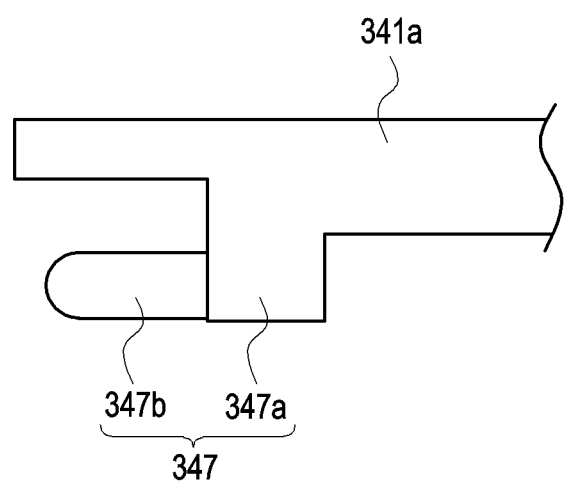
FIG. 8 is a diagram illustrating a second side view of a bar of a multi-bar structure in an electronic device according to various embodiments.

FIG. 6 is a diagram illustrating a multi-bar structure 304 of an electronic device (e.g., the electronic device 101, 102, 104, 200 or 300 of FIGS. 1 to 4) according to various embodiments. FIG. 7 is a first side view illustrating a rod 341*a* of a multi-bar structure 304 in an electronic device 300 according to various embodiments. FIG. 8 is a second side view illustrating a rod 341*a* of a multi-bar structure 304 in an electronic device 300 according to various embodiments.

Referring further to FIGS. 6, 7 and 8 together with FIG. 4, the multi-bar structure 304 may include a supporting structure 341 including an arrangement of multiple rods or bars 341*a* and at least one rail structure 345 formed on any one surface of the supporting structures 341. In the illustrated embodiment, a pair of rail structures 345 may be disposed on two opposite edges of the supporting structure 341 and may extend in the moving direction of the second housing 302, e.g., in the direction indicated by arrow ① (e.g., the X-axis direction). In an embodiment, an additional rail structure (not shown) may be disposed in the area between the illustrated pair of rail structures 345. In various embodiments, on the other surface of the supporting structure 341, the rail structure 345 may be formed substantially by an arrangement of guide protrusions 347 formed on the rods 341*a*. According to an embodiment, one surface of the supporting structure 341 may be a surface facing the display 303 and may be provided as a supporting surface 343*a* that substantially supports at least a portion of the second area A2, and the other surface of the supporting structure 341 may be provided as a guide surface 343*b*. In various embodiments, the supporting surface 343*a* and/or guide surface 343*b* may be formed substantially by an arrangement of rods 341*a*.

According to various embodiments, the bars 341*a* may extend in one direction (e.g., the Y-axis direction) and may be arranged in the direction of the arrow ①, and guide protrusion(s) 347 may be formed on their respective rods 341*a*. For example, when the rods 341*a* are arranged in the direction of the arrow ① to form the supporting structure 341, the guide projections 347 may be arranged in the direction of the arrow ① to form the rail structure 345. In an embodiment, the guide protrusion 347 may include a first guide protrusion 347*a* protruding from the other surface of the supporting structure 341, e.g., any one surface of the rod 341*a*, and a second guide protrusion 347*b* extending from the first guide protrusion 347*a*. The second guide protrusion 347*b* may be disposed substantially in the direction in which the rod 341*a* extends and/or parallel to the second area A2.

In the illustrated embodiment, the guide protrusion 347 and/or the rail structure 345 may be positioned in an area that substantially overlaps the area where the display 303 is disposed. In an embodiment, the guide protrusion 347 and/or rail structure 345 may be positioned substantially within the area provided by the supporting structure 341 (e.g., the guide surface 343*b*). In various embodiments, a plurality of second guide protrusions 347*b* (see FIG. 19) may be formed on one first guide protrusion 347*a*. In an embodiment, the second guide protrusion 347*b* may be formed on the first guide protrusion 347*a* in various positions.

According to various embodiments, at least a portion of the rail structure 345 may be movably coupled to the first guide member 325*a*. For example, the second guide protrusion 347*b* may be movably disposed in the guide groove 327*a* of FIG. 5. According to an embodiment, the rods 341*a* may be arranged substantially in a flat shape in the positions corresponding to the straight section LS of the guide groove 327*a*, and the rods 341*a* disposed in the curved section CS of the guide groove 327*a* may be disposed to be inclined with respect to each other to be arranged in a curved shape corresponding to the shape of the curved section CS. This is described in more detail in connection with the embodiments of FIGS. 9 to 11.

According to various embodiments, the rods 341*a* may form an area in which the display 303 (e.g., the second area A2) is substantially disposed, and the guide protrusions 347 and/or the rail structure 345 may be disposed to overlap the area in which the display 303 is disposed. According to an embodiment, the position, shape or size of the guide protrusions 347 and/or the rail structure 345 and the display 303 may be designed substantially independently of each other. For example, in designing the size or position of the display 303, the position, shape or size of the guide protrusions 347 and/or the rail structure 345 may be excluded from considerations, so that the ratio of the screen display area provided by the display 303 to the total surface area of the electronic device 300 may be increased. In various embodiments, the multi-bar structure 304 may be disposed so that the edges (e.g., the ends of the rods 341*a*) of the supporting structures 341 are movable in the first guide member 325*a* (e.g., the guide groove 327*a*), without the guide protrusions 347. In this case, the thickness of the first guide member 325*a* or the length of the bar 341*a* coupled to the first guide member 325*a* may limit the screen display area. This is described with reference to FIGS. 15 and 16.

According to various embodiments, one end of the multi-bar structure 304 may be coupled to the first housing 301 (e.g., the second plate 301*b*) and may be disposed to support at least a portion of the second area A2 of the display 303. For example, when the electronic device 300 is in an open state, the multi-bar structure 304, along with the second plate 301*b*, may at least partially form one plane. In an embodiment, in the position (e.g., the position illustrated in FIG. 2) where the second housing 302 is received in the first housing 301, the multi-bar structure 304 may be substantially received in the second housing 302. For example, if the second housing 302 is received in the first housing 301, the multi-bar structure 304 together with the fourth plate 321*a* may be received in the space between the first surface F1 and the second surface F2 (e.g., between the second plate 301*b* and the third plate 313*a*). According to an embodiment, if the second housing 302 is moved from the received position to the open position (e.g., the position illustrated in FIG. 3), the multi-bar structure 304 may be withdrawn from the second housing 302. As the second housing 302 moves from the open position to the received position, the multi-bar structure 304 may be received back in the second housing 302.

According to various embodiments, the second area A2 may be substantially coupled to the multi-bar structure 304. In an embodiment, the multi-bar structure 304, along with the second area A2, may be at least partially received in the second housing 302. For example, in a state in which the second housing 302 is received in the first housing 301, the multi-bar structure 304 and the second area A2 may be substantially received in the second housing 302, and if the second housing 302 is moved to the open position, the multi-bar structure 304 and the second area A2 may be exposed to the outside of the second housing 302. According to an embodiment, in the open state of the electronic device 300, the multi-bar structure 304 and a portion of the edge of the second area A2 may be positioned inside the second housing 302, e.g., between the second sidewall portion 323*b* and the second guide member 325*b*. In an embodiment, the first plate 311*a* may separate a space in which the second housing 302 (e.g., the fourth plate 321*a*) or the multi-bar structure 304 is received and a space in which the first circuit board 351 and/or the battery 355 is disposed. In an embodiment, as the second housing 302 slides with respect to the first housing 301, the multi-bar structure 304 and/or the second area A2 may be received in, or exposed to the outside of, the second housing 302.

According to various embodiments, the display 303 may be a flexible display, and the display 103 may normally remain in the flat shape and may be at least partially deformed into a curved shape. The display 303 may include at least one of, e.g., an organic light emitting diode, micro LED, and/or quantum dot display. For example, the first area A1 of the display 303 may be attached to or supported on the second plate 301*b* to substantially maintain a flat shape. A portion of the second area A2, adjacent to the second guide member 325*b* or the second sidewall portion 323*b*, may be deformed into a curved shape while the remaining portion may substantially maintain a flat shape. The multi-bar structure 304 may support the second area A2 and maintain it in a flat shape or may guide deformation of the second area A2 into a curved shape.

According to various embodiments, as the second housing 302 slides on the first housing 301, the area of the display 303 exposed to the outside may vary. The electronic device 300 (e.g., the processor 120 of FIG. 1) may change the area of the display 303, to be activated, based on the area of the display 303 exposed to the outside. For example, in the open state or in an intermediate state between the closed state and the open state, the electronic device 300 may activate a partial area exposed to the outside of the first housing 301 and/or the second housing 302 of the entire area of the display 303. In the closed state, the electronic device 300 may activate the first area A1 of the display 303 and deactivate the second area A2. In the closed state, when there is no user input for a designated period of time (e.g., 30 seconds or 2 minutes), the electronic device 300 may deactivate the entire area of the display 303. In various embodiments, in a state in which the entire area of the display 303 is inactivated, the electronic device 300 may activate a partial area of the display 303 to provide visual information, as necessary (e.g., a notification according to the user setting, a missed call/message arrival notification).

According to various embodiments, in the open state (e.g., the state shown in FIG. 3), the entire area (e.g., the first area A1 and the second area A2) of the display 303 may be substantially visible to the outside, and the first area A1 and the second area A2 may be arranged to form a plane. In an embodiment, even in the open state, a portion (e.g., one end) of the second area A2 may be positioned corresponding to the second guide member 325*b*, and the portion of the second area A2, which corresponds to the second guide member 325*b*, may remain in the curved shape. For example, according to various embodiments of the disclosure, despite the phrase "the second area A2 is disposed to form a plane in the open state (or closed state)," a portion of the second area A2 may remain in the curved shape. Likewise, although it is stated that "in the closed state, the multi-bar structure 304 and/or the second area A2 are received inside the second housing 302," a portion of the second area A2 and/or the multi-bar structure 304 may be positioned outside the second structure 302.

In the following description, the components are denoted with or without the same reference numerals and their detailed description may be omitted. According to an embodiment, an electronic device (e.g., the electronic device 300 of FIGS. 1, 2, 3 and 4) may be implemented by selectively combining configurations of different embodiments, and the configuration of an embodiment may be replaced by the configuration of an embodiment. However, it is noted that the disclosure is not limited to a specific drawing or embodiment.

Figure 9:
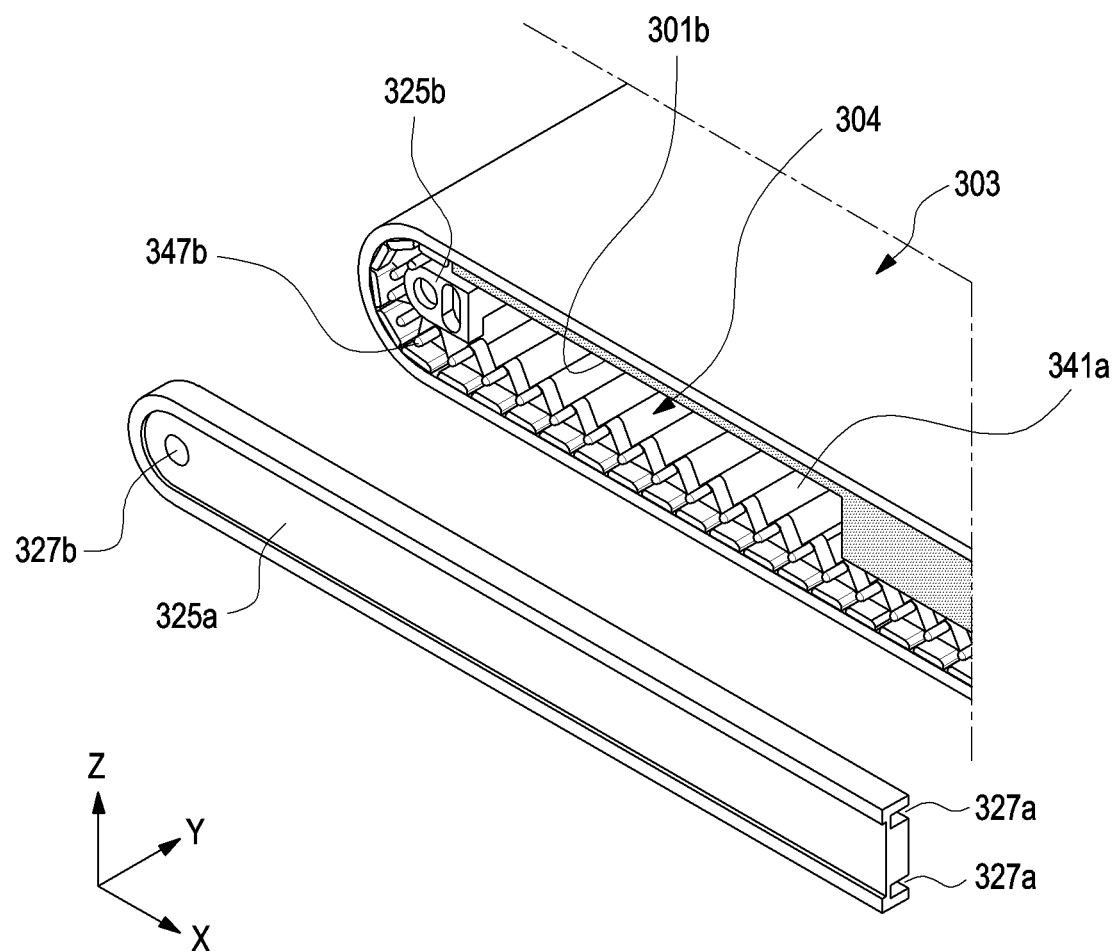
FIG. 9 is an exploded perspective view illustrating a state in which a multi-bar structure and a first guide member are coupled to each other in an electronic device, according to various embodiments.
Figure 10:
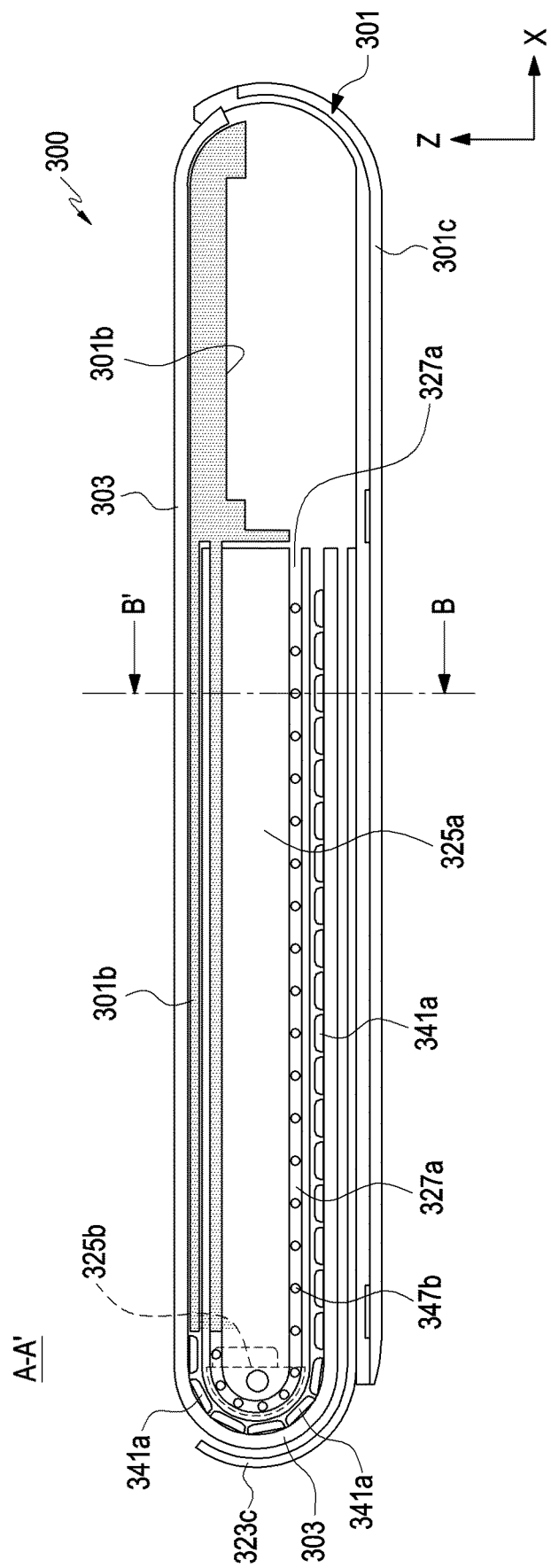
FIG. 10 is a cross-sectional view illustrating a portion of an electronic device according to various embodiments.
Figure 11:
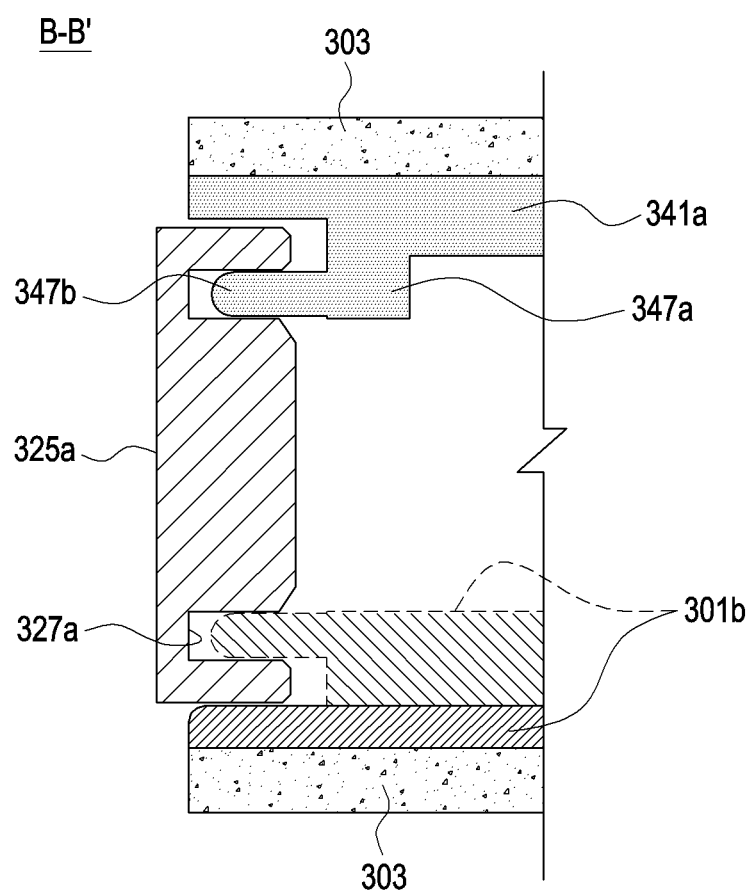
FIG. 11 is a cross-sectional view illustrating a portion of an electronic device, taken along line B-B' of FIG. 10 according to various embodiments.

FIG. 9 is an exploded perspective view illustrating an example in which a multi-bar structure 304 and a first guide member 325*a* are coupled together in an electronic device (e.g., the electronic device 101, 102, 104, 200, or 300 of FIGS. 1 to 4), according to various embodiments. FIG. 10 is a cross-sectional view illustrating a portion of the electronic device 300 according to various embodiments, e.g., taken along line A-A' of FIG. 2. FIG. 11 is a cross-sectional view illustrating a portion of the electronic device 300, taken along line B-B' of FIG. 10 according to various embodiments.

Referring further to FIGS. 9, 10 and 11, the first guide member 325*a* may be coupled to a guide protrusion (e.g., the second guide protrusion 347*b*) in a position adjacent to the edge of the multi-bar structure 304 and/or the second area A2. For example, at least a portion of the second guide protrusion 347*b* may be movably disposed in the guide groove (e.g., the guide groove 327*a* of FIG. 5). According to an embodiment, if the second housing 302 is received in the first housing 301, the second guide member 325*b* may be positioned adjacent to the first housing (e.g., the second plate 301*b*), and the second area A2 of the display 303 may be disposed to face in a substantially different direction from the first area A1. For example, if the second guide member 325*b* is positioned adjacent to the first area A1 of the display 303, the second area A2 may be substantially received in the second housing 302 and/or the first housing 301.

According to various embodiments, as the second housing 302 gradually moves from the received position to the open position, the second guide member 325*b* may gradually move away from the first plate 301*b*. When the second housing 302 is moved to the open position, the multi-bar structure 304 and/or the second area A2 may gradually move out of the second housing 302 while being guided by the guide groove 327*a* and/or the guide protrusion (e.g., the second guide protrusion 347*b*). While moving out of the second housing 302, in a position adjacent to the second guide member 325*b* or at a portion of the circumference of the second guide member 325*b*, the multi-bar structure 304 and/or the second area A2 may be deformed into a curved shape corresponding to the shape of the curved section CS of FIG. 5.

Figure 12:
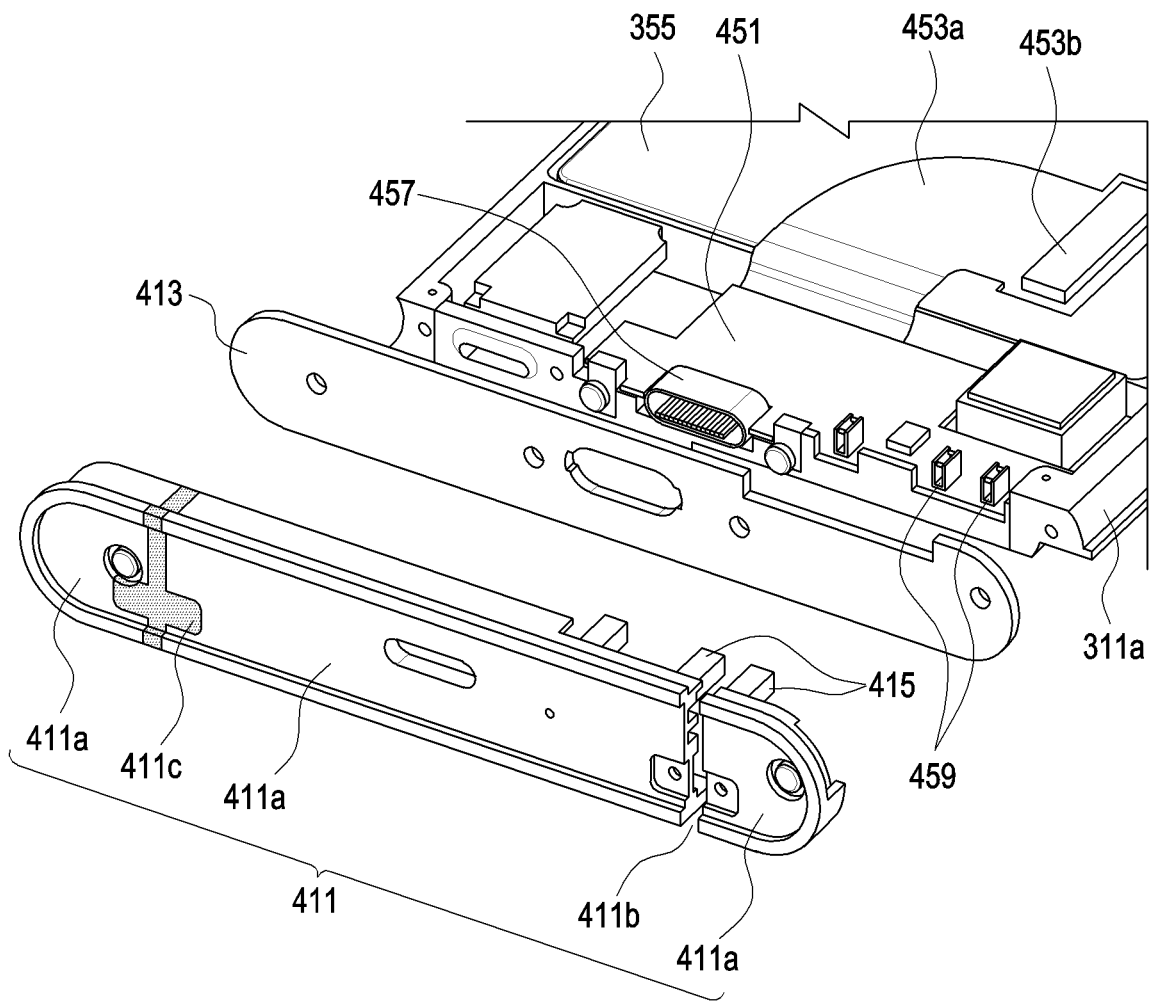
FIG. 12 is an exploded perspective view illustrating a portion of an electronic device according to various embodiments.
Figure 13:
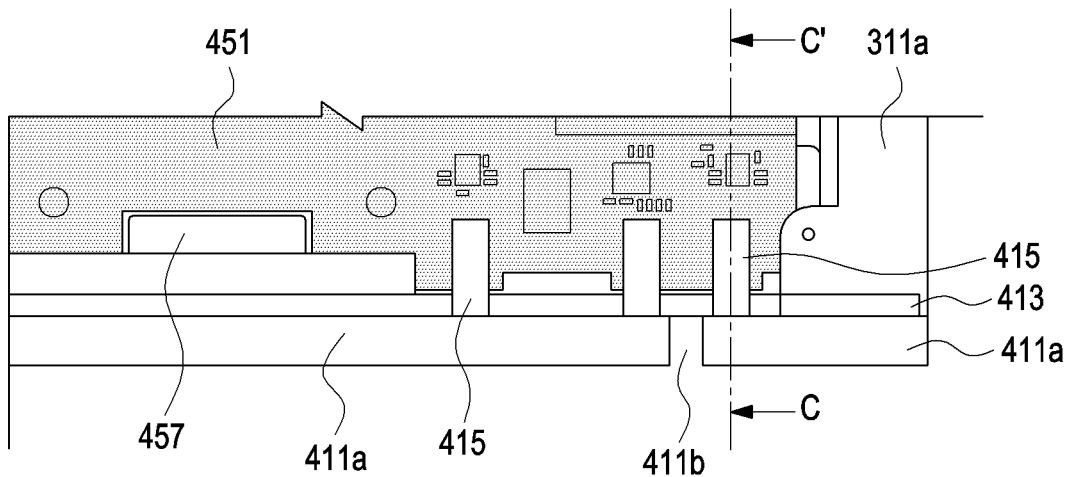
FIG. 13 is a diagram illustrating a portion of an electronic device according to various embodiments.
Figure 14:
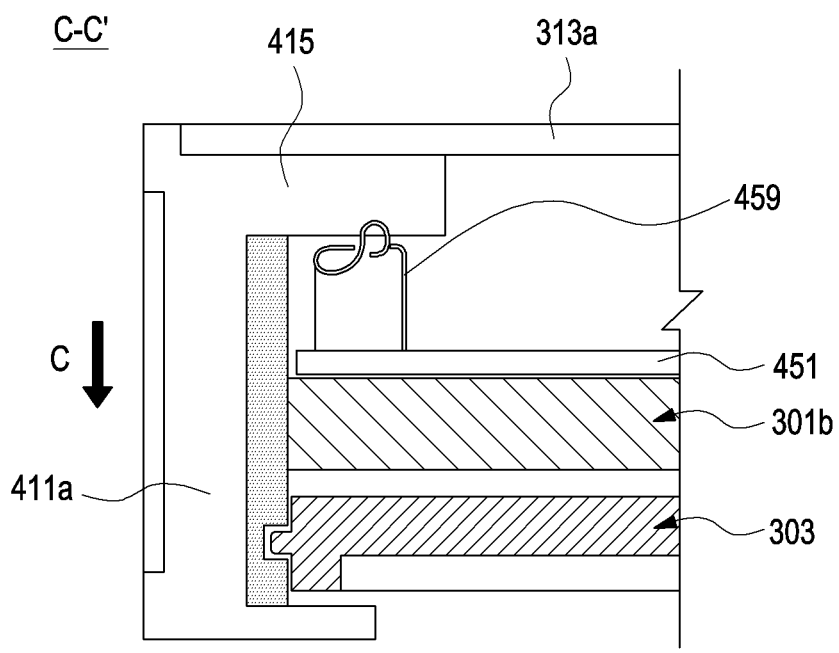
FIG. 14 is a cross-sectional view illustrating a portion of an electronic device, taken along line C-C' of FIG. 13 according to various embodiments.

FIG. 12 is an exploded perspective view illustrating a portion of an electronic device (e.g., the electronic device 101, 102, 104, 200, or 300 of FIG. 1 or 4) according to various embodiments. FIG. 13 is a diagram illustrating a portion of an electronic device 300 according to various embodiments. FIG. 14 is a cross-sectional view illustrating a portion of an electronic device, taken along line C-C' of FIG. 13 according to various embodiments.

Referring to FIGS. 12, 13 and 14, the electronic device 300 (e.g., the processor 120 or the communication module 190 of FIG. 1) may be configured to transmit/receive wireless signals using at least a portion of the side structure 411 (e.g., the side structures 311b and 313b of FIG. 4). The side structure 411 may be combined with the first plate 311a to form a first housing member (e.g., the first housing member 301a of FIG. 4) and may include at least one electrically conductive portion 411a. When the electronic device 300 transmits/receives radio signals through a portion of the side structure 411, an electrically insulating member 413 may be disposed between the side structure 411 and the first plate 311a. For example, when a portion of the side structure 411 is used as an antenna, the portion used as the antenna may be insulated from the other portion of the side structure 411 or the first plate 311a.

According to various embodiments, the side structure 411 may include a plurality of electrically conductive portions 411a and at least one electrically insulating portion 411c. In an embodiment, the electrically conductive portions 411a may be disposed apart from each other at a designated distance 411b and be mechanically connected or coupled to each other through the electrically insulating portion(s) 411c. In various embodiments, with the electrically conductive portions 411a disposed in a mold, insert molding may be performed, forming the electrically insulating portion(s) 411c in the gap between the electrically conductive portions 411a. The electrically insulating portion 411c may substantially couple the plurality of electrically conductive portions 411a, providing an electrically insulating structure. In the illustrated embodiment, the gap 411b may be viewed as an empty space but may be filled with an electrically insulating material substantially similar to or identical to the electrically insulating portion 411c during insert molding. For example, the side structure 411 may be manufactured simultaneously when the electrically insulating portions 411c are formed. According to an embodiment, after insert molding, the side structure 411 may be processed into a designed shape and size through a process, such as computer numerical control processing.

According to various embodiments, when the electrically conductive portion(s) 411a is used as an antenna, the electronic device 300 may further include at least one flange 415 extending from the side structure 411 and a second circuit board 451. According to an embodiment, the second circuit board 451 may include a connector 457 and/or a contact member(s) 459, and the connector 457 and/or the contact member(s) 459 may be disposed adjacent to the side structure 411 in an inner space (e.g., the space between the first surface A1 and the second surface A2 of FIG. 4, or the space between the first plate 311a and the second plate 301b) of the first housing (e.g., the first housing 301 of FIG. 1).

According to various embodiments, the second circuit board 451 may be electrically connected with the first circuit board 351 through the flexible printed circuit board 453a and/or the connection member 453b. As the flexible printed circuit board 453a is used in connecting the second circuit board 451 to the first circuit board 351, a wiring path may be freely designed. For example, the flexible printed circuit board 453a may be disposed in a path circumventing the battery 355 in a state of surrounding at least a portion of the battery 355. In an embodiment, the connector 457 may be mounted on one surface of the second circuit board 451 and may be disposed to correspond to a connector hole (e.g., the connector hole 243 of FIG. 2 or FIG. 3).

According to various embodiments, the flange(s) 415 may extend from the side structure 411 (e.g., the electrically conductive portion 411a) and be disposed to cross the electrically insulating member 413 and at least partially face the second circuit board 451. The contact member(s) 459 may be a structure having elasticity, such as, e.g., a C-clip or a pogo pin, and may be positioned to correspond to the flange 415 on the second circuit board 451. According to an embodiment, the contact member 459 may be a type of elastic member obtained by processing a metal plate. Although the contact member 459 is illustrated as having a shape overlapping the flange 415 in FIG. 14, the portion, illustrated as overlapping the flange 415, of the contact member 459 in an actual product, may be configured to move down (C) to contact the surface of the flange 415. The number and position of flanges 415 or contact members 459 may vary depending on the number and size of the electrically conductive portions 411a used as antennas and/or the frequency of transmitted/received radio waves. As another example, the flange 415 or the contact member 459 may be omitted. For example, the wireless communication circuit may be electrically connected with the electrically conductive portion 411a using a conductive member, such as a coaxial cable.

According to various embodiments, when a portion (e.g., the electrically conductive portion 411a) of the side structure 411 is used as an antenna, electromagnetic interference with other structures may degrade antenna performance. To prevent and/or reduce degradation of the antenna performance, the electronic device 300 may secure a sufficient gap between the antenna and another structure (e.g., the multi-bar structure 304 of FIG. 4 or 9) or place an electromagnetic shielding structure. In other embodiments, a deviation in antenna performance may occur due to relative position changes between structures depending on the closed state or open state. For example, when the multi-bar structure 304 includes an electrically conductive member, such as a metal, a deviation in antenna performance may occur between the state of being positioned adjacent to the side structure 411 (e.g., the closed state) and the state of being exposed to the outside of the second housing 302. In this case, when the side structure 411 transmits and receives a wireless signal, a portion of the radiated power may be induced in the multi-bar structure 304 and, as it becomes closer to the side structure 411, a parasitic current in the multi-bar structure 304 may increase. According to various embodiments of the disclosure, it is possible to expand the screen display area of the display 303 while preventing and/or reducing degradation of power radiations and to easily downsize the electronic device 300 while the screen display area remains the same. This is described in connection with comparison between the embodiments of FIGS. 15 and 16.

Figure 15:
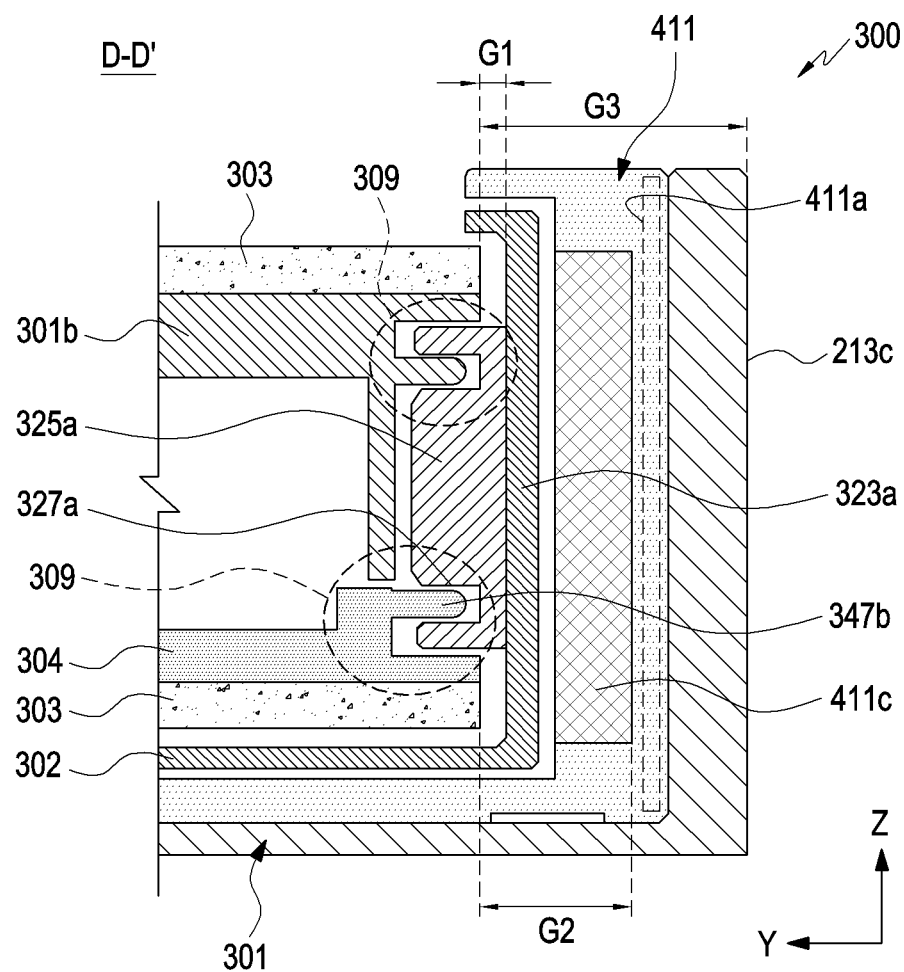
FIG. 15 is a cross-sectional view illustrating a portion of an electronic device according to various embodiments.
Figure 16:
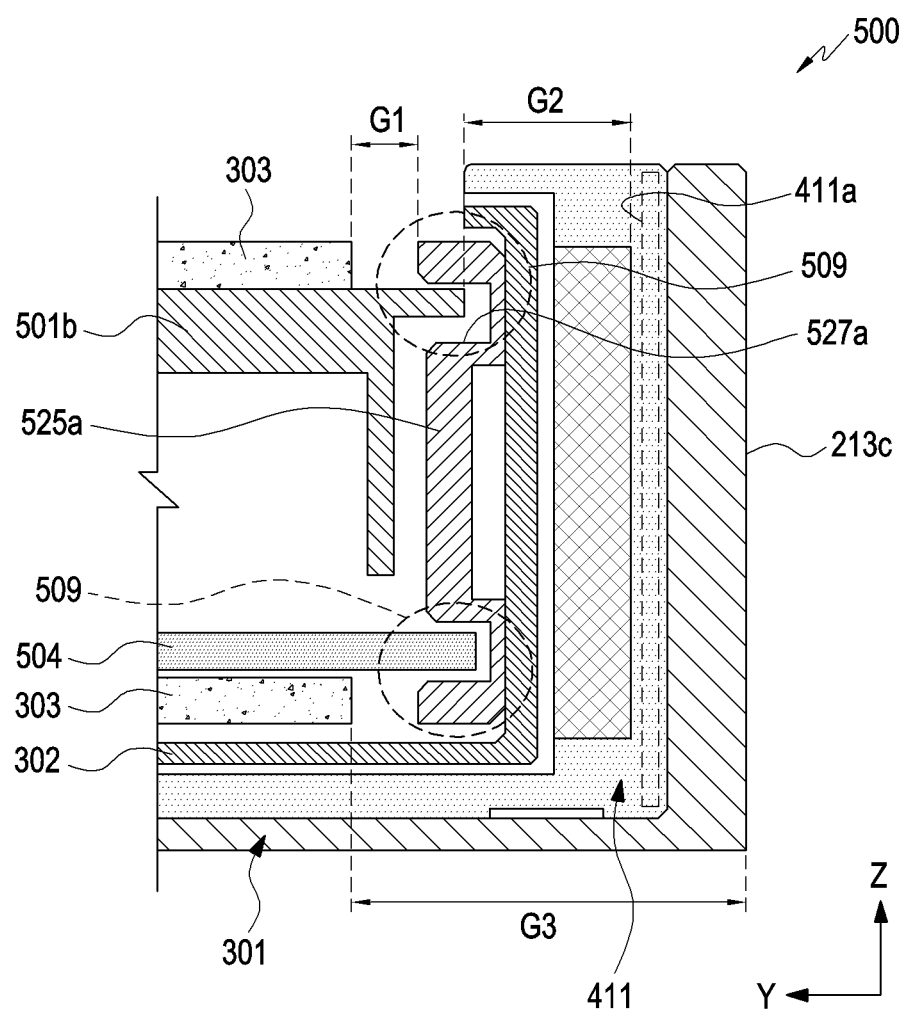
FIG. 16 is a cross-sectional view illustrating a portion of an electronic device according to a comparative example.

FIG. 15 is a cross-sectional view illustrating a portion of an electronic device (e.g., the electronic device 101, 102, 104, 200, or 300 of FIGS. 1 to 4) according to various embodiments, e.g., taken along line D-D' of FIG. 2. FIG. 16 is a cross-sectional view illustrating a portion of an electronic device 500 according to a comparative example.

Referring first to FIG. 15, the display 303 may have substantially the same size (e.g., the length in the Y-axis direction) as the multi-bar structure 304 and/or the second plate 301b. According to various embodiments of the disclosure, when viewed in the Z-axis direction, the guide structure 309 may be positioned to overlap the display 303. For example, in a state in which the second area A2 of the display 303 is received in the second housing 302, and the first area A1 of FIG. 4 is seen from the outside, the guide structure 309 may be substantially positioned between the first area A1 and the second area A2. Here, the "guide structure" may refer to a structure in which the rail structure 345 of FIG. 6 or the second guide protrusion 347b of FIG. 8 is movably disposed in the guide groove (e.g., the guide groove 327a of FIG. 5). In various embodiments, if the second housing 302 is received in the first housing 301, a portion of the second plate 301b may be movably received in the guide groove 327a.

According to various embodiments, a designated first gap G1 may be formed between a sidewall portion (e.g., the first sidewall portion 323a) of the second housing 302 and the display 303. The first gap G1 may prevent and/or reduce the edge of the display 303 from interfering with the first sidewall portion 323a of the second housing 302, e.g., when the display 303 moves on the second housing 302. According to an embodiment, a designated second gap G2 may be formed between the multi-bar structure 304 and the antenna, e.g., the electrically conductive portion 411a of the side structure 411. The second gap G2 refer, for example, to a gap capable of blocking the generation of a parasitic current in the multi-bar structure 304 when the electrically conductive portion 411a operates as an antenna.

According to various embodiments, reference numeral '411a' for the area surrounded by the dashed line in FIG. 15 or FIG. 16 may indicate a portion of the electrically conductive portion 411a of FIG. 12, functioning as an antenna, for ease of description. However, in various embodiments disclosed herein, the electrically conductive portion or the portion functioning as an antenna is not limited to the position or shape illustrated in FIGS. 15 and 16, and at least a portion of the electrically conductive portion 411a of FIG. 12 may function as an antenna. In various embodiments, the first guide member 325a may be at least partially formed of an electrically insulating material and may form or maintain the second gap G2 in a state in which the multi-bar structure 304 is received in the second housing 302 and/or the first housing 301. In an embodiment, at least a portion of the electrically insulating portion 411c of the side structure 411 may be disposed on the inner surface of the electrically conductive portion 411a. For example, as a recess is formed inside the electrically conductive portion 411a, a sufficient gap (e.g., the second gap G2) may be formed between the antenna (e.g., the electrically conductive portion 411a) and the multi-bar structure 304, and the electrically insulating portion 411c may be formed or disposed in the recess of the electrically conductive portion 411a to maintain or enhance mechanical strength.

According to various embodiments, as the first interval G1 increases, the display 303 is less likely to be damaged, but the screen display area of the display 303 may be reduced. In an embodiment, as the second interval G2 increases, it is possible to secure stable antenna performance in wireless communication. For example, even in a position where the multi-bar structure 304 is received in the second housing 302, it is possible to suppress the generation of a parasitic current in the multi-bar structure 304. According to an embodiment, as the guide structure 309 is disposed at a substantially different height than the display 303 (e.g., in different positions in the Z-axis direction), it is possible to freely design the display 303 to enlarge or shrink the display 303 in the Y-axis direction. As compared through FIG. 16, when the guide structure 309 (e.g., the guide structure 509 of FIG. 16) is disposed between the display 303 and the side structure 411 (e.g., at the same height as the display 303 in the Z-axis direction), the guide structure 309 may be an obstacle to substantially downsizing the electronic device 300 or increasing the size of the display 303.

According to various embodiments, the third interval G3, illustrated by way of example in FIG. 15 or FIG. 16, is an area in which a screen cannot be displayed substantially on the front surface of the electronic device 300 and reduce the ratio of the screen display area of the display 303 to the surface area of the electronic device 300. As the guide structure 309 is disposed at a different height from the display 303 or in a position where the guide structure 309 overlaps the display 303 or is hidden by the display 303 when viewed from the outside, the third gap G3 formed between the surface (e.g., the outer surface of the electrically conductive portion 411a) of the first housing 301 and the display 303 may be smaller than that in the comparative example of FIG. 16. For example, when viewed from outside of the electronic device 300, the ratio of the screen display area of the display 303 to the surface area of the electronic device 300 may increase.

Referring to FIG. 16, in the electronic device 500 of the comparative example, the guide structure 509 may be disposed between the display 303 and the side structure (e.g., the electrically conductive portion). For example, the edge of the first plate 501b or the edge (e.g., two opposite ends of the rod(s) 341a of FIG. 6) of the multi-bar structure 504 may be received in the guide member 525a (e.g., the guide groove 527a). In an embodiment, as the edge of the multi-bar structure 304 is received in the guide groove 527a, the display 303 has a smaller size than the multi-bar structure 304 and thus may not interfere with the guide member 525a. In an embodiment, one end of the multi-bar structure 304 in the Y-axis direction may be received in the guide member 525a (e.g., the guide groove 527a), and an end of the display 303 may be positioned at the designated first gap G1 from the guide member 525a. For example, while the first gap G1 is defined as the gap between the display 303 and the first sidewall portion 323a of the second housing 302 in the embodiment of FIG. 15, a portion of the guide member 525a may be further positioned between the display 303 and the first sidewall portion 323a of the second housing 302 in the comparative example of FIG. 16. As mentioned above, the first gap G1 may be provided to prevent and/or reduce the display 303 from interfering with other fixing structures (e.g., the second housing 302 of FIG. 15 or the guide member 525a of FIG. 16). The second gap G2 may be provided to secure a substantially stable antenna performance or to prevent and/or reduce a deviation in antenna performance due to a relative position difference between the housings 301 and 302.

According to various embodiments, when the first interval G1 and the second interval G2 are the same in the embodiment of FIG. 15 and the comparative example of FIG. 16, e.g., when the specifications for preventing and/or reducing damage to the display 303 or securing antenna performance are the same, the third gap G3 (e.g., the gap between the outer surface of the electrically conductive portion 411a and the display 303) may be smaller in the embodiment of FIG. 15 than in the comparative example of FIG. 16. For example, the third gap G3 of FIG. 16 may be the sum of the third gap G3 of FIG. 15 and the width of the guide structure 509 (e.g., the thickness of the guide member 525a measured along the Y-axis direction). In a structure in which the guide structure 509 is disposed at substantially the same height (e.g., the same position in the Z-axis direction) as the display 303 as illustrated in FIG. 16, the width of the guide structure 509 (e.g., the length measured in the Y-axis direction) may be substantially part of the third interval G3 and may be an obstacle to enlarging the display 303. According to an embodiment, when the size of the display 303 is the same, the structure in which the guide structure 509 is disposed at substantially the same height as the display 303 as illustrated in FIG. 16 may be an obstacle to downsizing the electronic device 500.

According to various embodiments of the disclosure, the placement of the guide structure 309 in an area (e.g., different positions in the Z-axis direction) substantially overlapping the display 303 may contribute to enlarging the display 303 or downsizing the electronic device 300 or 500. In an embodiment, when the size of the display 303 or the size of the electronic devices 300 and 500 is the same, the guide structure 309 is disposed in the area substantially overlapping the display 303, contributing to enhancing antenna performance. In the comparative example of FIG. 16, if the size of the electronic device 500 (e.g., the first housing 301) and the size of the display 303 are the same as those in the embodiment of FIG. 15, the guide structure 509 of FIG. 16 may be positioned adjacent to the antenna (e.g., the electrically conductive portion 411a). For example, the multi-bar structure 504 may be positioned adjacent to the antenna, degrading antenna performance According to various embodiments of the disclosure, when the size of the display 303 or the size of the electronic devices 300 and 500 is the same, the guide structure 309 of FIG. 15 is disposed, so that the gap between the multi-bar structure 304 and the antenna (e.g., the electrically conductive portion 411a) may be designed to be larger. Accordingly, it is possible to prevent or suppress the generation of a parasitic current in the multi-bar structure 304 when the electrically conductive portion 411a operates as an antenna.

Figure 17:
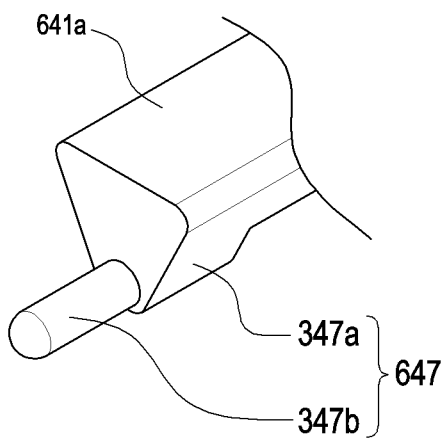
FIG. 17 is a perspective view illustrating a modification to a multi-bar structure and/or a guide protrusion in an electronic device according to various embodiments.
Figure 18:
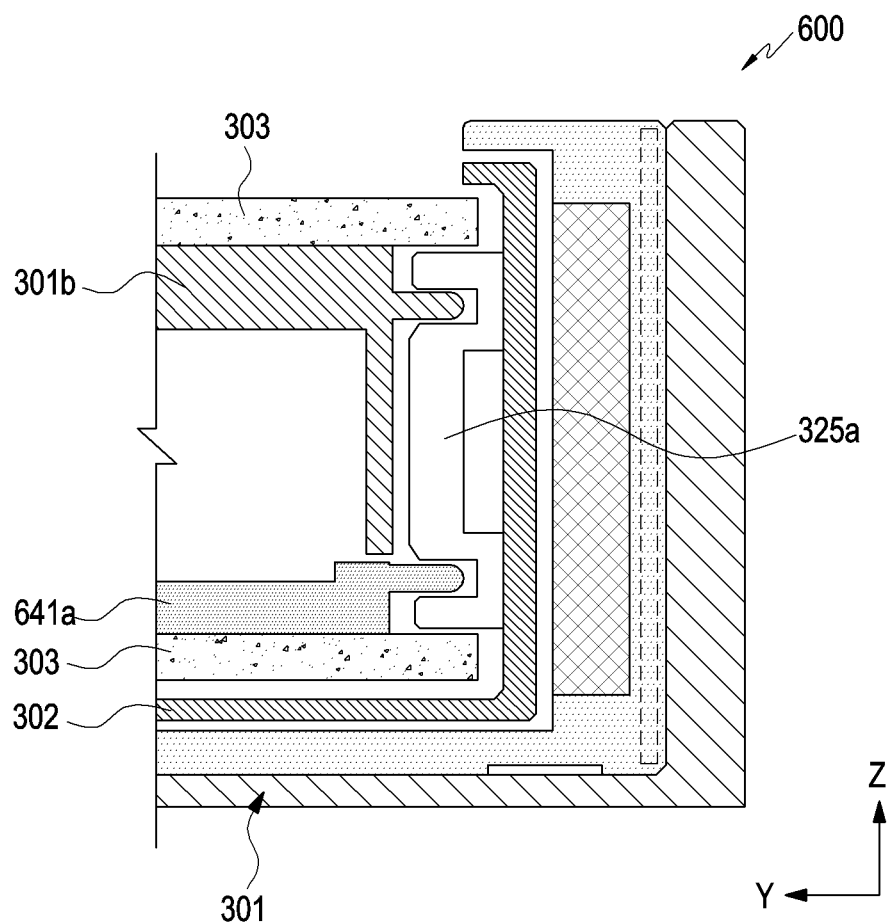
FIG. 18 is a cross-sectional view illustrating an electronic device according to various embodiments.

FIG. 17 is a perspective view illustrating a modification 647 to the multi-bar structure (e.g., the multi-bar structure 304 of FIG. 4 or 6) and/or the guide protrusion (e.g., the guide protrusion 347 of FIG. 7 or 8) in the electronic device (e.g., the electronic device 101, 102, 104, 200, or 300 of FIGS. 1 to 4 and/or FIG. 15) according to various embodiments. FIG. 18 is a cross-sectional view illustrating an electronic device 600 according to various embodiments.

Referring to FIGS. 17 and 18, the guide protrusion 647 may at least partially protrude outward from an end of the rod 641a. For example, the first guide protrusion 347a may protrude from any one surface of the bar 641a in a position adjacent to an end of the bar 641a, and the second guide protrusion 347b may extend from the first guide protrusion 347a in a direction substantially parallel to the rod 641a. According to an embodiment, the multi-bar structure 304 may support a portion of the second area (e.g., the second area A2 of FIG. 4) of the display 303. At least a portion of the edge of the second area A2 may be substantially supported by a guide member (e.g., the first guide member 325a of FIG. 4). For example, the structure supporting the second area A2 of the display 303 may be formed by a combination of the multi-bar structure 304 and the first guide member 325a.

Figure 19:
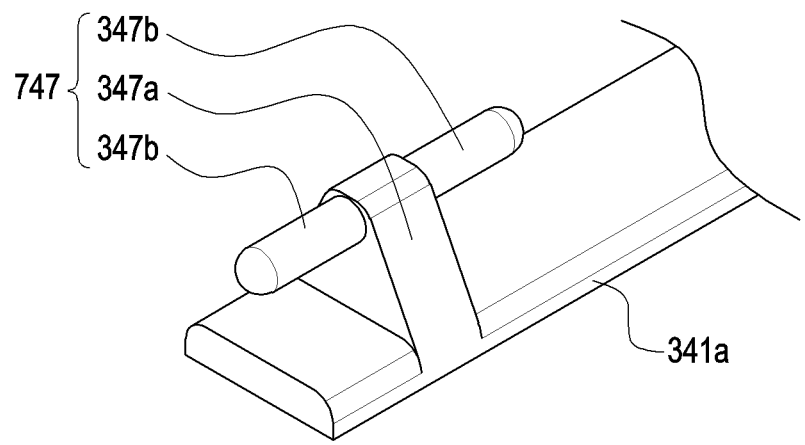
FIG. 19 is a perspective view illustrating a modification to a multi-bar structure and/or a guide protrusion in an electronic device according to various embodiments.
Figure 20:
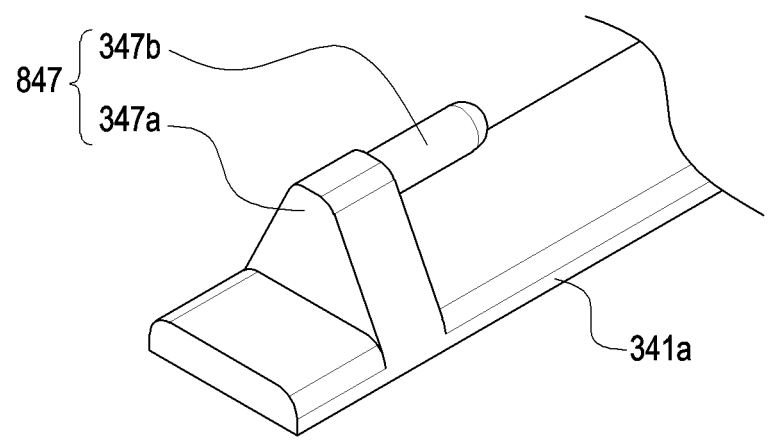
FIG. 20 is a perspective view illustrating a modification to a multi-bar structure and/or a guide protrusion in an electronic device according to various embodiments.

FIG. 19 is a perspective view illustrating a modification 747 to the multi-bar structure (e.g., the multi-bar structure 304 of FIG. 4 or 6) and/or the guide protrusion (e.g., the guide protrusion 347 of FIG. 7 or 8) in the electronic device (e.g., the electronic device 101, 102, 104, 200, or 300 of FIGS. 1 to 4 and/or FIG. 15) according to various embodiments. FIG. 20 is a perspective view illustrating a modification to the multi-bar structure 304 and/or the guide protrusion 847 in the electronic device 300 according to various embodiments.

Referring to FIG. 19, guide protrusions 747 may include one first guide protrusion 347a and a plurality of second guide protrusions 347b. For example, the first guide protrusion 347a may protrude from any one surface of the rod 341a, and a pair of second guide protrusions 347b may extend from the first guide protrusion 347a in directions in which the pair of second guide protrusions 347b are away from each other. In an embodiment, the second guide protrusions 347b may be disposed substantially parallel to the bar 341a or the second area A2 of the display 303. When the guide protrusions 747 include a plurality of second guide protrusions 347b, the guide member (e.g., the first guide member 325a of FIG. 4) may include a guide groove (e.g., the guide groove 327a of FIG. 5) corresponding to the overall shape (e.g., the letter "T") of the guide protrusion 747 or a plurality of guide grooves corresponding to the plurality of second guide protrusions 347b.

According to an embodiment, the guide protrusion 747 may be disposed in a middle area of the rod 341a. In this case, a pair of guide protrusions (e.g., the guide protrusions 347 of FIG. 8, or the guide protrusions 647 of FIG. 17) may be disposed on two opposite sides of the rod 341a, and the guide protrusion 747 may be positioned in the middle area of the bar 341a, allowing for more secure support when pressure is applied to the display 303.

Referring to FIG. 20, guide protrusions 847 may include one first guide protrusion 347a and one second guide protrusion 347b. The second guide protrusion 347b may extend from the inside of the first guide protrusion 347a. For example, when first guide protrusions 347a are provided at two opposite ends of the rod 341a, the second guide protrusion 347b may extend from one of the first guide protrusions 347a to the other. For example, it should be noted that the guide protrusions 347, 647, 747, or 847 may be provided in various shapes or numbers, and the embodiments illustrated in the drawings do not limit various embodiments of the disclosure.

According to various example embodiments of the disclosure, an electronic device (e.g., the electronic device 101, 102, 104, 200, 300, or 600 of FIGS. 1 to 4, 15, and/or 18) may comprise: a first housing (e.g., the first housing 201 or 301 of FIGS. 2 to 4), a flexible display (e.g., the display 203 or 303 of FIGS. 2 to 4) including a first area (e.g., the first area A1 of FIG. 3 or 4) disposed on the first housing and a second area (e.g., the second area A2 of FIG. 3 or 4) extending from the first area and deformable into a curved shape, and a multi-bar structure (e.g., the multi-bar structure 304 of FIGS. 4, 6, 9, and/or 15) comprising multiple bars and having an end coupled to the first housing and deformably supporting the second area. The multi-bar structure may include a support (e.g., the supporting structure 341 of FIG. 6) having one surface (e.g., the supporting surface 343a of FIG. 6) disposed to support the second area, and at least one rail (e.g., the rail structure 345 of FIG. 6) disposed on another surface of the support when viewed from outside of the flexible display, the rail is at least partially disposed in an area overlapping the second area.

According to various example embodiments, the support may include a plurality of rods (e.g., the rod 341a of FIGS. 6 to 8) arranged along a direction (e.g., the direction of arrow ① of FIGS. 2 and 3 or the X-axis direction of FIG. 4). The rail may include at least one first guide protrusion (e.g., the first guide protrusion 347a of FIG. 7 and/or FIG. 8) protruding from any one surface of the rods and at least one second guide protrusion (e.g., the second guide member 347*b* of FIG. 7 and/or FIG. 8) extending from the first guide protrusion and disposed in parallel to the second area.

According to various example embodiments, a pair of the second guide protrusions (e.g., the second guide protrusions 347*b* of FIG. 19) may extend from the first guide protrusion in directions away from each other.

According to various example embodiments, the second guide protrusion (e.g., the second guide protrusion 347*b* of FIG. 17) may protrude outward from ends of the rods in directions in which the rods extend.

According to various example embodiments, the rail may be disposed at each of two opposite edges of the support and extend along a direction in which the rods are arranged.

According to various example embodiments, the first housing may include a first surface (e.g., the first surface F1 of FIG. 4), a second surface (e.g., the second surface F2 of FIGS. 2 to 4) facing away from the first surface, and a side wall (e.g., the sidewalls 213*a*, 213*b*, and 213*c* of FIG. 2 or the side structure 311*a* or 313*a* of FIG. 4) at least partially surrounding a space between the first surface and the second surface. At least a portion of the multi-bar structure may be selectively received in the space between the first surface and the second surface.

According to various example embodiments, the electronic device may further comprise: at least one flange (e.g., the flange 415 of FIG. 12) extending inwardly from the side wall, a circuit board (e.g., the second circuit board 451 of FIG. 12) disposed in the space between the first surface and the second surface, at least one contact (e.g., the contact member(s) 459 of FIG. 12) disposed on the circuit board and contacting the flange, and a processor or a communication module comprising communication circuitry (e.g., the processor 120 or the communication module 190 of FIG. 1) disposed on the circuit board. The processor or the communication module may be configured to transmit and receive a wireless signal using at least a portion (e.g., the electrically conductive portion 411*a* of FIG. 12) of the side wall.

According to various example embodiments, the electronic device may further comprise: a second housing (e.g., the second housing 202 or 302 of FIGS. 2 to 4) coupled to be slidable from one side of the first housing and configured to be selectively received in the space between the first surface and the second surface, at least one first guide (e.g., the first guide member 325*a* of FIGS. 4, 5, 9, and/or 15) disposed on an inner wall of the second housing and including a guide groove (e.g., the guide groove 327*a* of FIG. 5) formed in one surface thereof, and a second guide (e.g., the second guide member 325*b* of FIGS. 4 and/or 9) mounted on the first guide. The second area or the multi-bar structure may be configured to be selectively received in the second housing.

According to various example embodiments, the guide groove may include a pair of straight sections (e.g., the straight sections LS of FIG. 5) and a curved section (e.g., the curved section CS of FIG. 5) connecting the straight sections. At least a portion (e.g., the second guide protrusion 347*b* of FIGS. 7, 8, and/or 9) of the rail may be disposed to be movable in the guide groove.

According to various example embodiments, the electronic device may further comprise: a processor or a communication module comprising communication circuitry configured to transmit and receive a wireless signal using at least a portion of the side wall. The first guide may at least partially include an electrically insulating material (e.g., polyoxymethylene (POM)) and may be at least partially disposed between the side wall and the multi-bar structure when the second housing is received in the first housing.

According to various example embodiments, the second area or the multi-bar structure may be configured to be received in or withdrawn out of the second housing through an interval between an inner surface (e.g., the second sidewall portion 323*b* of FIG. 4) of the second housing and the second guide.

According to various example embodiments, the second area or the multi-bar structure, together with the second housing, may be configured to be received in the first housing, with the second area or the multi-bar structure received in the second housing.

According to various example embodiments, a pair of the first guides may be disposed in the second housing while facing each other and be individually coupled to two opposite ends of the second guide.

According to various example embodiments, the electronic device may further comprise: a second housing coupled to be slidable from one side of the first housing and configured to be selectively received in the first housing, a pair of first guides disposed on an inner wall of the second housing while facing each other, and a second guide mounted on the first guide. As the second housing is received in the first housing, the second area or the multi-bar structure may be configured to be received in the second housing while being guided by at least one of the first guides or the second guide.

According to various example embodiments, the first housing may include a first surface, a second surface facing away from the first surface, and a side wall at least partially surrounding a space between the first surface and the second surface. The first guides may at least partially include an electrically insulating material and may be configured to be at least partially disposed between the side wall and the multi-bar structure when the second housing is received in the first housing.

According to various example embodiments, the electronic device may further comprise: a processor or a communication module comprising communication circuitry. The processor or the communication module may be configured to transmit and receive a wireless signal using at least a portion of the side wall adjacent to the multi-bar structure, with any one of the first guides disposed therebetween.

According to various example embodiments of the disclosure, an electronic device (e.g., the electronic device 101, 102, 104, 200, 300, or 600 of FIGS. 1 to 4, 15, and/or 18) may comprise: a first housing (e.g., the first housing 201 or 301 of FIGS. 2 to 4) including a first surface (e.g., the first surface F1 of FIG. 4), a second surface (e.g., the second surface F2 of FIGS. 2 to 4) facing away from the first surface, and a side wall (e.g., the sidewalls 213*a*, 213*b*, and 213*c* of FIG. 2 or the side structure 311*a* or 313*a* of FIG. 4) at least partially surrounding a space between the first surface and the second surface, a second housing (e.g., the second housing 202 or 302 of FIGS. 2 to 4) coupled to be slidable from one side of the first housing and configured to be selectively received in the first housing, guide grooves (e.g., the guide groove 327*a* of FIG. 5) individually formed in surfaces facing each other inside the second housing, a flexible display (e.g., the display 203 or 303 of FIGS. 2 to 4) including a first area (e.g., the first area A1 of FIG. 3 or 4) disposed on the first housing and a second area (e.g., the second area A2 of FIG. 3 or 4) extending from the first area and deformable into a curved shape, and a multi-bar structure including multiple bars (e.g., the multi-bar structure 304 of FIGS. 4, 6, 9, and/or 15) having an end coupled to the first housing and deformably supporting the second area while moving on the second housing. The multi-bar structure may include a support (e.g., the supporting structure 341 of FIG. 6) including a plurality of rods (e.g., the rod 341a of FIGS. 6 to 8) arranged along one direction and having one surface disposed to support the second area and at least one rail (e.g., the rail structure 345 of FIG. 6) disposed on another surface of the support in an area overlapping the second area when viewed outside of the flexible display. The rail may be at least partially disposed to be movable in the guide groove. The second area or the multi-bar structure may be configured to be selectively received in the second housing as the second housing slides.

According to various example embodiments, the electronic device may further comprise: a processor or a communication module comprising communication circuitry (e.g., the processor 120 or the communication module 190 of FIG. 1). The processor or communication module may be configured to transmit and receive a wireless signal using at least a portion (e.g., the electrically conductive portion 411a of FIG. 12) of the side wall adjacent to the multi-bar structure.

According to various example embodiments, in the electronic device as described above, the second housing may further include an electrically insulating structure comprising an insulating material (e.g., the first guide member 325a of FIG. 4 or FIG. 5). In a state in which the second housing is received in the first housing, the electrically insulating structure may be at least partially disposed between the multi-bar structure and a portion (e.g., the electrically conductive portion 411a of FIG. 12) of the side wall transmitting and receiving a wireless signal.

According to various example embodiments, the guide groove may be at least partially formed in the electrically insulating structure.

While the disclosure has been illustrated and described with reference to various example embodiments, it will be understood that the various example embodiments are intended to be illustrative, not limiting. It will also be apparent to those of ordinary skill in the art that various changes in form and detail may be made without departing from the true spirit and full scope of the disclosure, including the appended claims and their equivalents.

What is claimed is:

1. An electronic device, comprising:
   a first housing;
   a second housing configured to be movable relative to the first housing;
   a flexible display including a first area disposed on the first housing and a second area extending from the first area, wherein the second area is configured to be deformable into a curved shape while the second housing moves relative to the first housing; and
   a multi-bar structure including a plurality of bars and supporting the second area,
   wherein the multi-bar structure includes:
      a support including a first surface, facing the flexible display, to support the second area;
      at least one first guide protrusion protruding from a second surface opposite to the first surface of the support, and
      at least one second guide protrusion extending from the first guide protrusion, and
   wherein while the second housing moves in the first housing, when viewed from outside of the flexible display, the at least one second protrusion is configured to be at least partially disposed to overlap at least portion of the second area.

2. The electronic device of claim 1, wherein the support includes a plurality of rods arranged along a direction, and wherein the at least one first guide protrusion protrudes from any one surface of each one of the plurality of rods.

3. The electronic device of claim 2, wherein a pair of the second guide protrusions extend from a pair of the first guide protrusions respectively in directions away from each other.

4. The electronic device of claim 2, wherein the at least one of second guide protrusion protrudes outward from ends of the plurality of rods in directions in which the plurality of rods extend.

5. The electronic device of claim 1, wherein the first housing includes a first surface, a second surface facing away from the first surface of the first housing, and a side wall at least partially surrounding a space between the first surface and the second surface of the first housing, and wherein at least a portion of the multi-bar structure is configured to be selectively received in the space between the first surface and the second surface of the first housing.

6. The electronic device of claim 5, further comprising:
   at least one flange extending inwardly from the side wall;
   a circuit board disposed in the space between the first surface and the second surface of the first housing;
   at least one contact disposed on the circuit board and contacting the flange; and
   a processor or a communication module comprising communication circuitry disposed on the circuit board,
   wherein the processor or the communication module is configured to transmit and receive a wireless signal using at least a portion of the side wall.

7. The electronic device of claim 5, further comprising:
   at least one first guide disposed on an inner wall of the second housing and including a guide groove formed in one surface thereof; and
   a second guide mounted on the first guide,
   wherein the second housing is configured to be selectively received in the space between the first surface and the second surface of the first housing, and
   wherein the multi-bar structure is configured to be selectively received in the second housing.

8. The electronic device of claim 7, wherein the guide groove includes a pair of straight sections and a curved section connecting the straight sections, and wherein at least a portion of the at least one second guide protrusion is disposed to be movable in the guide groove.

9. The electronic device of claim 7, further comprising a processor or a communication module comprising communication circuitry configured to transmit and receive a wireless signal using at least a portion of the side wall,
   wherein the first guide at least partially includes an electrically insulating material and is configured to be at least partially disposed between the side wall and the multi-bar structure when the second housing is received in the first housing.

10. The electronic device of claim 7, wherein the second area or the multi-bar structure is configured to be received in or withdrawn out of the second housing through an interval between an inner surface of the second housing and the second guide.

11. The electronic device of claim 7, wherein the second area or the multi-bar structure, together with the second housing, is configured to be received in the first housing, with the second area or the multi-bar structure received in the second housing.

12. The electronic device of claim 7, wherein a pair of the first guides are disposed in the second housing facing each other and are individually coupled to two opposite ends of the second guide.

13. The electronic device of claim 1, further comprising:
a pair of first guides disposed on an inner wall of the second housing and facing each other; and
a second guide mounted on the first guide,
wherein as the second housing is received in the first housing, the second area or the multi-bar structure is configured to be received in the second housing while being guided by at least one of the first guides or the second guide.

14. The electronic device of claim 13, further comprising a processor or a communication module comprising communication circuitry,
wherein the first housing includes a first surface, a second surface facing away from the first surface of the first housing, and a side wall at least partially surrounding a space between the first surface and the second surface,
wherein the first guides at least partially include an electrically insulating material and are configured to be at least partially disposed between the side structure and the multi-bar structure when the second housing is received in the first housing, and
wherein the processor or the communication module is configured to transmit and receive a wireless signal using at least a portion of the side wall adjacent to the multi-bar structure, with any one of the first guide members disposed therebetween.

* * * * *